(12) United States Patent
Jungwirth

(10) Patent No.: US 7,818,552 B2
(45) Date of Patent: Oct. 19, 2010

(54) OPERATION, COMPARE, BRANCH VLIW PROCESSOR

(75) Inventor: Patrick W. Jungwirth, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 453 days.

(21) Appl. No.: 11/960,932

(22) Filed: Dec. 20, 2007

(65) Prior Publication Data

US 2009/0164753 A1    Jun. 25, 2009

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/236
(58) Field of Classification Search .................. 712/24, 712/236

See application file for complete search history.

(56) References Cited

U.S. PATENT DOCUMENTS 5,450,556 A    9/1995  Slavenburg et al.
5,805,850 A *  9/1998  Luick ......................... 712/215
6,374,346 B1   4/2002  Seshan et al.
6,694,435 B2   2/2004  Kiddy et al.
7,010,668 B2   3/2006  Drabenstott et al.
2005/0147239 A1  7/2005  Chin et al.

OTHER PUBLICATIONS

Patterson et al.; Computer Organization and Design: The Hardware/Software Interface; 1998; Second Edition; Morgan Kaufmann Publishers, Inc.*
Atallah et al., A Survey of Anti-Tamper Technologies, Cross Talk, Nov. 2004, pp. 1-8, www.stsc.hill.af.mil/crosstalk/2004/11/0411Atallah.html.
Hou et al., Three Control Flow Obfuscation Methods for JAVA Software, IEE Proceedings-Software, Issue 2, pp. 80-86, Apr. 2006.
Lakhotia et al., Abstracting Stack to Detect Obfuscated Calls in Binaries, Fourth IEEE International Workshop on Source Code Analysis and Manipulation, pp. 17-27, 2004.
Collberg et al., Watermarking, Tamper-Proofing, and Obfuscation—Tools for Sofware Protection, IEEE Transactions on Software Engineering, vol. 28, Issue 8, pp. 735-746, Aug. 2002.

* cited by examiner

*Primary Examiner*—Eddie P Chan
*Assistant Examiner*—Corey Faherty
(74) *Attorney, Agent, or Firm*—Michael K. Gray

(57) ABSTRACT

A VLIW processor is provided with an architecture which includes fetching and executing circuitry which when combined with operation, compare, branch (OCB) instructions realizes no processing branch penalties. The OCB instructions are provided with two direct branch fields or with two indirect branch fields.

5 Claims, 29 Drawing Sheets

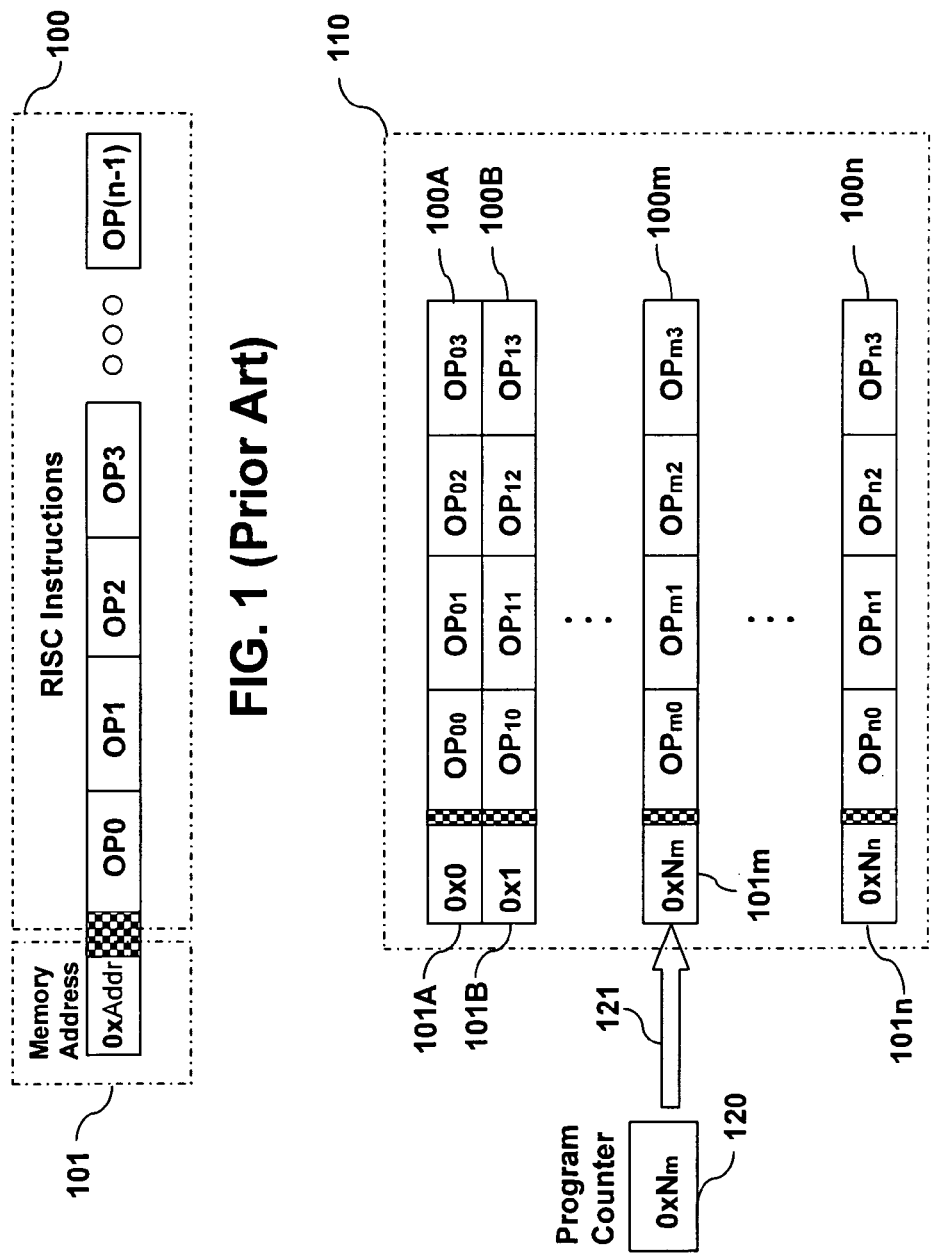

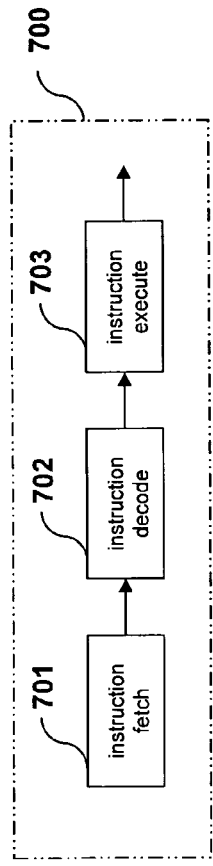
FIG. 7 (Prior Art)
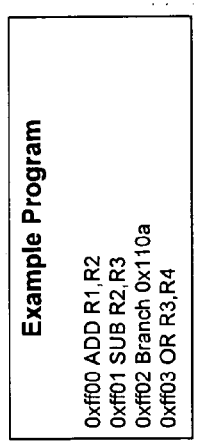
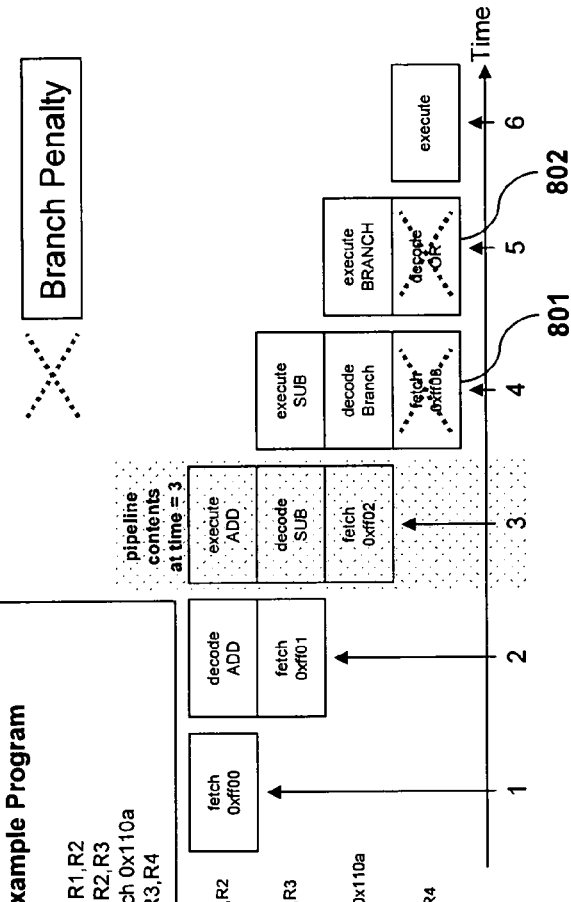
FIG. 8 (Prior Art)

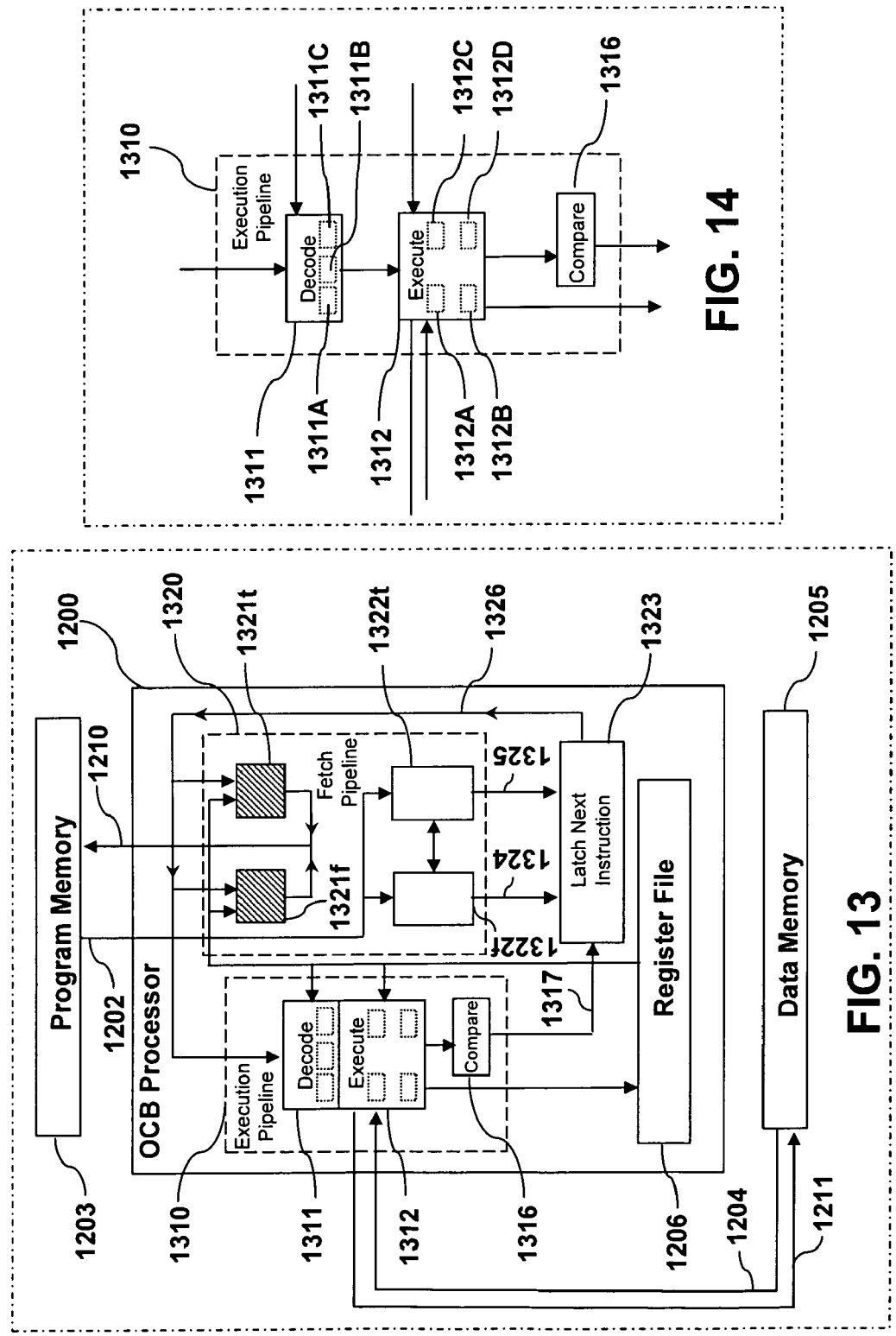

| Instruction | Op Code | Description |
|---|---|---|
| ADD | 0x00 | Add and compare |
| SUB | 0x01 | Subtract and compare |
| OR | 0x02 | OR and compare |
| AND | 0x03 | AND and compare |
| XOR | 0x04 | Exclusive OR and compare |
| RR | 0x05 | Rotate right and compare |
| RL | 0x06 | Rotate left and compare |
| SR | 0x07 | Shift right and compare |
| SL | 0x08 | Shift left and compare |
| LD | 0x09 | Load from memory and compare |
| ST | 0x0a | Store to memory and compare |
| NEG | 0x0b | Invert sign, and compare |
| NOP | 0x0c | No operation and compare |
| NOT | 0x0d | binary NOT and compare |
| RD | 0x0e | Generate random number and |

FIG. 18

| Branch | Description | Direct Branch Mode | Indirect Branch Mode[1] |
|---|---|---|---|
| BZR | If zero result | Branch to AddrTrue, else AddrFalse | Branch to [Rt], else [Rf] |
| BZP | If zero or positive | Branch to AddrTrue, else AddrFalse | Branch to [Rt], else [Rf] |
| BZN | If zero or negative | Branch to AddrTrue, else AddrFalse | Branch to [Rt], else [Rf] |
| BPO | If positive result | Branch to AddrTrue, else AddrFalse | Branch to [Rt], else [Rf] |
| BNG | If negative result | Branch to AddrTrue, else AddrFalse | Branch to [Rt], else [Rf] |
| BEQ Rk[2] | If equal to Rk | Branch to AddrTrue, else AddrFalse | Branch to [Rt], else [Rf] |
| BNQ Rk | If not equal Rk | Branch to AddrTrue, else AddrFalse | Branch to [Rt], else [Rf] |
| BGT Rk | If greater than Rk | Branch to AddrTrue, else AddrFalse | Branch to [Rt], else [Rf] |
| BLT Rk | If less than Rk | Branch to AddrTrue, else AddrFalse | Branch to [Rt], else [Rf] |
| BGE Rk | If greater than or equal to Rk | Branch to AddrTrue, else AddrFalse | Branch to [Rt], else [Rf] |
| BLE Rk | If less than or equal to Rk | Branch to AddrTrue, else AddrFalse | Branch to [Rt], else [Rf] |
| BTR | Branch to AddrTrue | Branch to AddrTrue | Branch to [Rt] |
| BFL | Branch to AddrFalse | Branch to AddrFalse | Branch to [Rf] |
| BRN | Branch Random | Randomly select: AddrTrue or AddrFalse | Randomly select: [Rt], or [Rf] |

[1] Indirect addressing, [Rt] and [Rf] are pointers, and [2] Rk is any valid register.

FIG. 19

| Addressing Mode | OCB Assembly Language Examples (Direct Branch) | |
|---|---|---|
| Register | Line_10 ADD R0, R1, R2 | CMP R3 AddrTrue, AddrFalse |
| Inherent Data | Line_11 ADD R0, R1, #data | CMP R3 AddrTrue, AddrFalse |
| Memory Direct | Line_12 ADD R0, R1, Mem | CMP R3 AddrTrue, AddrFalse |
| Memory Indirect | Line_13 ADD R0, R1, [R2] | CMP R3 AddrTrue, AddrFalse |
| Register | Line_20 NEG R0, R1 | CMP R3 AddrTrue, AddrFalse |
| Inherent Data | Line_21 NEG R0, #data | CMP R3 AddrTrue, AddrFalse |
| Memory Direct | Line_22 NEG R0, Mem | CMP R3 AddrTrue, AddrFalse |
| Memory Indirect | Line_23 NEG R0, [R2] CMP R3 AddrTrue, AddrFalse | |
| Register | Line_30 LD R0, R1 | CMP R3 AddrTrue, AddrFalse |
| Inherent Data | Line_31 LD R0, #data | CMP R3 AddrTrue, AddrFalse |
| Memory Direct | Line_32 LD R0, Mem | CMP R3 AddrTrue, AddrFalse |
| Memory Indirect | Line_33 LD R0, [R2] CMP R3 AddrTrue, AddrFalse | |
| Register | Line_40 ST R0, R1 | CMP R3 AddrTrue, AddrFalse |
| Inherent Data | Line_41 ST R0, \data | CMP R3 AddrTrue, AddrFalse |
| Memory Direct | Line_42 ST R0, Mem | CMP R3 AddrTrue, AddrFalse |
| Memory Indirect | Line_43 ST R0, [R2] CMP R3 AddrTrue, AddrFalse | |

FIG. 20

| Addressing Mode | OCB Assembly Language Examples (Indirect Branch) | | |
|---|---|---|---|
| Register | Line_50 ADD R0, R1, R2 | CMP R3 [R5], [R6] | // AddrTrue = [R5], |
| Inherent Data | Line_51 ADD R0, R1, #data | CMP R3 [R5], [R6] | // AddrFalse= [R6] |
| Memory Direct | Line_52 ADD R0, R1, Mem | CMP R3 [R5], [R6] | |
| Memory Indirect | Line_53 ADD R0, R1, [R2] | CMP R3 [R5], [R6] | |
| | | | |
| Register | Line_60 NEG R0, R1 | CMP R3 [R5], [R6] | |
| Inherent Data | Line_61 NEG R0, #data | CMP R3 [R5], [R6] | |
| Memory Direct | Line_62 NEG R0, Mem | CMP R3 [R5], [R6] | |
| Memory Indirect | Line_63 NEG R0, [R2] CMP R3 [R5], [R6] | | |
| | | | |
| Register | Line_70 LD R0, R1 | CMP R3 [R5], [R6] | |
| Inherent Data | Line_71 LD R0, #data | CMP R3 [R5], [R6] | |
| Memory Direct | Line_72 LD R0, Mem | CMP R3 [R5], [R6] | |
| Memory Indirect | Line_73 LD R0, [R2] CMP R3 [R5], [R6] | | |
| | | | |
| Register | Line_70 ST R0, R1 | CMP R3 [R5], [R6] | |
| Inherent Data | Line_71 ST R0, \data | CMP R3 [R5], [R6] | |
| Memory Direct | Line_72 ST R0, Mem | CMP R3 [R5], [R6] | |
| Memory Indirect | Line_73 ST R0, [R2] CMP R3 [R5], [R6] | | |

FIG. 21

```
// Simple Test Program for insertion sort
// b[ ] = input array to sort
#include <stdio.h>
#include <stdlib.h>
void insertSort(int a[], int length)
{
  int i = 0;
  int j = 0;
  int value = 0;
  for (i=1;i < length;i++)
  {
    value = a[i];
    for(j=i-1;j>=0 &&
        a[j]>value ;j--)
    {
      a[j+1]=a[j];
    }
    a[j+1] = value;
  }
}
int main(int argc, char *argv[])
{
  int b[16];
  int last = 16;
  b[0]='i';
  b[1]='n';
  b[2]='s';
  b[3]='e';
  b[4]='r';
  b[5]='t';
  b[6]='i';
  b[7]='o';
  b[8]='n';
  b[9]=' ';
  b[10]='s';
  b[11]='o';
  b[12]='r';
  b[13]='t';
  b[14]='!';
  b[15]='!';
    insertSort(b,last);
  int m;
  for(m=0;m<last;m++)
    {
    printf("%c",b[m]);
    printf("%c",' ');
    }
  printf("%c",'\n');
  system("PAUSE");
  return 0;
}
```

// Screen capture of the output //

```
! ! e i i n n o o r r s s t t
Press any key to continue . . .
```

FIG. 27 (Prior Art)

```
***************************************************************
*                                                              *
*   Insertion Sort for an array of bytes, length <=16          *
*                     for example                              *
*          OCB8 Very Long Instruction Word Processor           *
*                                                              *
***************************************************************
void insertSort(int a[], int length)
{
// R0 points to array a[]
ISort         LD R0,#0      BZR          ISORT1,EXIT
// R1 is the length of a[]
ISort1        LD R1,#LEN    BPO          ISORT2,EXIT
// R2 is the constant = 1
ISort2        LD R2,#1      BPO          ISORT3,EXIT
   int i = 1;
// R3 is the index i-- R3=0 since Loop1 increments R3 before sort starts
ISort3        LD R3,#0      BZP          ISORT4,EXIT
   int j =0;
// R4 is the index j
ISort4        LD R4,#0      BZR          ISORT5,EXIT
   int value = 0;
// R5 is variable value
ISort5        LD R5,#0      BZR          LOOP1,EXIT
   for (i=1; i < length; i++)
   {
// i=i+1, i<length, R3=i, then value else exit
LOOP1         ADD R3,R3,R2  BLT R1       VALUE,EXIT
      value = a[i];
// R5 = value, R3 points to a[i] // i starts at 1
VALUE         LD R5,[R3]    BTR          INITLP2,EXIT
// Initialize LOOP2, and test for j>=0
INITLP2       SUB R4,R3,R2  BZP          LOOP2,ELOOP2
      for(j=i-1; j>=0 && a[j] > value; j--)
      {
// j=i-1, test j >= 0  R4=j
LOOP2         SUB R6,R3,R2  BZP          TESTAJ,ELOOP2,
// a[j] > value, note R4 = j, R6 = a[j]
TESTAJ        LD R6,[R4]    BGT R5       MOVE,ELOOP2
         a[j+1]=a[j];
// R7=j+1
MOVE          ADD R7,R4,R2  BTR          MOVE1,EXIT
// store a[j] in a[j+1], R7 points to a[j+1], R6 = a[j]
MOVE1         ST R6,[R7]    BTR          DECJ,EXIT
// j --
DECJ          SUB R4,R4,R2  BTR          MOVE,EXIT
      }
      a[j+1] = value;
// R7=j+1
ELOOP2        ADD R7,R4,R2  BTR          COPY,EXIT
// copy value to pointer [R7]
COPY          ST R5,[R7]    BTR          LOOP1,EXIT
   }
}
EXIT
```

FIG. 28

```
****************************************************
*                                                  *
*              Non-Obfuscated                      *
*  Insertion Sort for an array of bytes, length <=16 *
*              for example                         *
*  OCB8 Very Long Instruction Word Processor       *
*                                                  *
****************************************************
00  ISort      LD  R0,#0                BZR    ISORT1,EXIT
01  ISort1     LD  R1,#LEN              BPO    ISORT2,EXIT
02  ISort2     LD  R2,#1                BPO    ISORT3,EXIT
03  ISort3     LD  R3,#0                BZP    ISORT4,EXIT
04  ISort4     LD  R4,#0                BZR    ISORT5,EXIT
05  ISort5     LD  R5,#0                BZR    LOOP1,EXIT
06  LOOP1      ADD R3,R3,R2             BLT R1 VALUE,EXIT
07  VALUE      LD  R5,[R3]              BTR    INITLP2,EXIT
08  INITLP2    SUB R4,R3,R2             BZP    LOOP2,ELOOP2
09  LOOP2      SUB R6,R3,R2             BZP    TESTAJ,ELOOP2
10  TESTAJ     LD  R6,[R4]              BGT R5 MOVE,ELOOP2
11  MOVE       ADD R7,R4,R2             BTR    MOVE1,EXIT
12  MOVE1      ST  R6,[R7]              BTR    DECJ,EXIT
13  DECJ       SUB R4,R4,R2             BTR    LOOP2,EXIT
14  ELOOP2     ADD R7,R4,R2             BTR    COPY,EXIT
15  COPY       ST  R5,[R7]              BTR    LOOP1,EXIT
16  EXIT
```

FIG. 29

```
***********************************************
*                                              *
*           Obfuscated                         *
*   Insertion Sort for an array of bytes, length <=16
*                   for example               *
*        OCB8 Very Long Instruction Word Processor
*                                              *
***********************************************
00  MOVE1     ST  R6,[R7]       BTR          DECJ,EXIT
01  ISort3    LD  R3,#0         BZP          ISORT4,EXIT
02  LOOP2     SUB R6,R3,R2      BZP          TESTAJ,ELOOP2
03  TESTAJ    LD  R6,[R4]       BGT R5       MOVE,ELOOP2
04  ISort5    LD  R5,#0         BZR          LOOP1,EXIT
05  DECJ      SUB R4,R4,R2      BTR          LOOP2,EXIT
06  ELOOP2    ADD R7,R4,R2      BTR          COPY,EXIT
07  ISort2    LD  R2,#1         BPO          ISORT3,EXIT
08  EXIT
09  ISort4    LD  R4,#0         BZR          ISORT5,EXIT
10  VALUE     LD  R5,[R3]       BTR          INITLP2,EXIT
11  MOVE      ADD R7,R4,R2      BTR          MOVE1,EXIT
12  ISort     LD  R0,#0         BZR          ISORT1,EXIT
13  INITLP2   SUB R4,R3,R2      BZP          LOOP2,ELOOP2
14  ISort1    LD  R1,#LEN       BPO          ISORT2,EXIT
15  LOOP1     ADD R3,R3,R2      BLT R1       VALUE,EXIT
16  COPY      ST  R5,[R7]       BTR          LOOP1,EXIT
```

FIG. 31

Label032   MULADD   R0,R1,R2,R3 CMP R4   Less_Than,   Equal,   Greater_Than
                                          R0 < R4,     R0 == R4,   R0 > R4

Operation for MULADD, multiply and add, R0 = R1 + (R2)(R3)
with three branch addresses for R0 < R4, R0 == R4, R0 > R4

FIG. 33

OPERATION, COMPARE, BRANCH VLIW PROCESSOR

DEDICATORY CLAUSE

The invention described herein may be manufactured, used and licensed by or for the US Government for governmental purposes without the payment of any royalties.

BACKGROUND OF THE INVENTION

A prior art Very Long Instruction Word (VLIW) instruction is shown 100 in FIG. 1. The VLIW instruction 100 is located at memory address 101. The VLIW instruction consists of a number of operations: OP0, OP1, OP2, OP3, ... OP(n−1). These n operations are multiple Reduced Instruction Set Computer (RISC) instructions which are to be run in parallel on a VLIW processor.

In FIG. 2, program counter register (PCR) 120 is used to select a memory address $0xN_m$ from a prior art VLIW memory map 110. The notation 0x is used to indicate a hexadecimal number. Arrow 121 is pointing to the address $0xN_m$ which is located at program memory address $101_m$. Memory address 0x0 is the lowest program memory address 101A. Program memory address 0x1 is a higher address than address 0x0, and $0xN_n$ is the highest memory address. Each memory address has a corresponding row of operation instructions which represent a given VLIW instruction. For example, memory address 0x0 has operation instructions $OP_{00}$, $OP_{01}$, $OP_{02}$, and $OP_{03}$ which constitute VLIW instruction 100A. At address 0x1, operation instructions $OP_{10}$, $OP_{11}$, $OP_{12}$, and $OP_{13}$ constitute VLIW instruction 100B. At address $0xN_m$, operation instructions $OP_{m0}$, $OP_{m1}$, $OP_{m2}$, and $OP_{m3}$ constitute VLIW instruction $100_m$. At address $0xN_n$, operation instructions $OP_{n0}$, $OP_{n1}$, $OP_{n2}$, and $OP_{n3}$ constitute VLIW instruction 100n.

The program counter 120 points 121 to the address of the VLIW instruction to be executed. As an illustrative example, each VLIW instruction 100A, 100B, ... $100_m$, ..., $100_n$ consists of four operations which are to be executed in parallel.

FIG. 3 introduces a prior art very long instruction word (VLIW) processor 131 having execution circuitry 132 having multiple execution units for processing each operation instruction of a given VLIW instruction 100 in parallel. Each VLIW instruction or VLIW word, e.g., VLIW instructions 100A, 100B, $100_m$, etc., contains multiple reduced instruction set computer (RISC) operation instructions, e.g., operation instructions $OP_{00}$, $OP_{01}$, $OP_{02}$, and $OP_{03}$ of VLIW instruction 100A. In FIG. 3, the execution circuitry 132 is executing instructions OP0, OP1, OP2 and OP3 in parallel. The execution circuitry 132 is linked to register file 136. Program counter register 120 is contained in register file 136.

Program counter 120 contains a pointer to program memory address $0xN_m$. In FIG. 3, VLIW instruction fetch 135 fetches VLIW instruction $101_m$ from program memory 111 pointed to (arrow 121) by program counter 120 (FIG. 2) in register file 136. The VLIW instruction is then processed by decoder 134. Next, the operation instructions for the VLIW instruction are executed in parallel by the execution circuitry 132. Program counter 120 is incremented to point to the next VLIW instruction. The process is then repeated for the next VLIW instruction which is fetched from program memory at the next selected memory address contained in program counter 120.

Linked list data structures have been one method of arranging or organizing data stored or mapped in computer memory. Some simple linked list structures of the prior art are the singly-linked list and the doubly-linked list. In FIG. 4, the singly-linked list in block 400 has a starter pointer 401 which points to node or element 402. Node 402 contains data L, and a pointer 403 to node 404. Node 404 contains data I and pointer 405. Pointer 405 points to node 406. Node 406 contains data S and pointer 407. Pointer 407 points to node 408. Node 408 contains data T and pointer 409. Pointer 409, called the NULL pointer, points to the end node (end of the linked list) called NULL 410. With reference to FIG. 5, the doubly-linked list 500 has a start forward pointer 501, and a start reverse pointer 514. The forward start pointer 501 allows the linked listed to be read in the forward direction and the reverse start pointer 514 allows the list to be read in reverse. Each node 503, 506, 509, and 512, contains a forward pointer, a reverse pointer, and data. The NULL pointers in 513 and 502 define the end of the linked lists.

In FIG. 6, a more complicated prior art linked list structure 600 has an arrangement of nodes where some nodes are filled with data such as L, I, N, K, E, D L, I, S, T, etc. and some nodes have empty cells such as node 603. The nodes are connected by pointers, such as pointers 601 and 602. Watermarks can be embedded in the lengths and positions of the pointers as illustrated in 604. Watermarking is a prior art software protection technique. Watermarks can be placed inside computer software using prior art software protection tools. Other software protection techniques include obfuscation, opaque predicates, transformations, and application performance degradation.

In the computer art, a pipeline microprocessor breaks the instruction down into a series of smaller processing steps. The pipeline is understood to be a stream of processing steps connected in series such that the output of stage n is connected to the input of stage (n+1). In prior art microprocessors, the pipeline architecture provided a way to speed up the number of instructions processed per second.

In FIG. 7, a simple prior art, three stage pipeline 700 is shown. The pipeline consists of three stages: instruction fetch 701, instruction decode 702, and instruction execution 703. The instruction fetch 701, reads in an instruction from main or program memory. The instruction decode stage in 702, "formats" the instruction for execution. In the instruction execute block 703, data processing occurs. As shown in FIG. 7, the stages 701, 702, and 703 are connected together in series. To complete execution of a machine language instruction, it must sequentially travel through the stages 701, 702, and 703. The pipeline 700 encounters a difficulty when a branch or jump instruction occurs.

A 'branch instruction' in a computer pipeline changes the flow of the instructions. However, before the flow can be changed, the pipeline must first be cleared out because the partially completed instruction contained in stages 701 and 702 is invalid. To clear out the pipeline, no-operations are placed in the pipeline stages 701 and 702. This clearing out process results in an inactive time period in the pipeline which is known as the branch penalty. The no-operations perform no useful computer processing and reduce the performance of the microprocessor.

The time/space diagram for the execution pipeline of FIG. 8 demonstrates what happens to a three stage pipeline such as that of FIG. 7 when a branch instruction occurs. For example at time=3, instruction fetch is reading at address 0xff02, the instruction, SUB, at 0xff01 is being decoded, and ADD from 0xff00 is being executed. When time=5, the branch instruction from 0xff02 is being executed. The problem here is the instruction branches to address 0x110a, not 0xff03. Looking at the pipeline, we see that the instruction associated with address 0xff03, has been read into the instruction fetch stage 801 at time=4, and decoded at decode stage 802 at time=5. However, as a result of the branching, the next address to be read is at 0x110a; thus, instruction fetch stage 801 and decode stage 802 contain the partially completed operations for the wrong instruction, e.g. 0xff03 instead of 0x110a. The penalty for processing the branch instruction (branch penalty) has reduced the amount of processing done.

In prior art microprocessors, branch prediction, branch target prediction and speculative execution are used to reduce the branch penalty in pipeline microprocessors; however, such techniques typically result in inefficiency. In prior art software protection techniques, the software protection techniques require processing time and further reduce the performance of prior art microprocessors, VLIW processors, etc.

SUMMARY OF THE INVENTION

Prior art microprocessors use a program counter register (PCR) to select the next machine code instruction to execute. The architecture of the OCB processor of the present invention is a linked list which connects machine code level instructions together. The present invention does not exclude or preclude the use of a program counter register, but a program counter register is not required for the OCB processor of the present invention.

Further, the architecture of the present invention eliminates branch penalties from pipeline microprocessors while accommodating software obfuscation techniques with hardware levels of performance. A variety and/or combination of software security techniques can be implemented in the present invention including control flow, watermarking, stack obfuscation, opaque predicates, and transformation functions, etc.

In the present invention, the execution pipeline of the OCB processor is able to process branch or jump instructions without branch prediction and without any branch penalty (i.e., without performance penalty from mis-predicted branches) while allowing multiple software obfuscation techniques to be incorporated with hardware levels of performance.

An OCB instruction is a series of related computer instructions which include an operation, a comparison, a branch, and two or more pointers which point to the possible next instructions. Extensions to more complex instructions are possible. The pointers form the linked list that connects the OCB instructions together; thus no program counter register is required. All instructions contain branch or jump addresses for two or more, direct or indirect, addresses. In the case of two branch addresses, there are branches for a 'true' condition, and a 'false' condition. Due to the linked list nature of the OCB processor, relative and absolute addressing are similar.

Unlike a traditional VLIW processor which executes a number of reduce instruction set computer (RISC) instructions in parallel, the OCB processor of the present invention combines multiple related operations into a long instruction word. The OCB processor's instruction fetch pipeline balances the memory access times to read in the next two or more instructions to the processing time required to complete the logic or arithmetic operation, and comparison in the execution pipeline.

The present invention includes A VLIW computer architecture having a memory which is a computer readable medium whose output is to be processed and displayed on a computer monitor. A memory map is contained in the memory with the memory map having a plurality of OCB VLIW instructions, with each instruction of the plurality of OCB VLIW instructions having a respective memory address, a respective operation code, a respective comparison and branch code; and at least two respective pointer branches with the at least two respective pointer branches pointing to a memory address of one instruction of the plurality of OCB instructions.

Still further, in the present invention, an obfuscated branch condition is presented where one of two or more branch addresses is randomly selected to be the next execution address.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a block diagram portraying a prior art VLIW instruction.

FIG. 2 is a block diagram portraying a prior art program counter register pointing to the currently executing VLIW instruction contained in program memory.

FIG. 7 is a block diagram which is illustrative of a prior art three-stage pipeline.

FIG. 8 is a time/space diagram for the execution pipeline that demonstrates the branch penalty in prior art microprocessors.

FIG. 13 is a schematic block diagram showing the execution pipeline and fetch pipeline for an OCB processor of the present invention.

FIG. 14 is a schematic block diagram of the execution pipeline of the OCB processor of the present invention.

FIG. 18 is a table illustrative of the instruction set used in the simulation of the OCB VLIW processor according to the present invention.

FIG. 19 is a table illustrative of branch conditions and branch modes used in the simulation of the OCB VLIW processor according to the present invention.

FIG. 20 is a table illustrative of OCB direct branch assembly language instructions.

FIG. 21 is table illustrative of OCB indirect branch assembly language instructions where registers' contents, [Rt] and [Rf], are used as indirect pointers for the AddrTrue and Addr-False addresses.

FIG. 27 demonstrates the prior art Insertion Sort Routine.

FIG. 28 is an Insertion Sort Program written to run on a simulation of an OCB processor of the present invention.

FIG. 29 is a Non-Obfuscated Insertion Sort written to run on a simulation of an OCB processor of the present invention.

FIG. 31 is an Obfuscated Insertion Sort for a simulation of the OCB processor of the present invention.

FIG. 33 is an example of how the concept of the OCB processor of the present invention can be extended to more than two branching possibilities for a given instruction.

DETAILED DESCRIPTION

Figure 3:
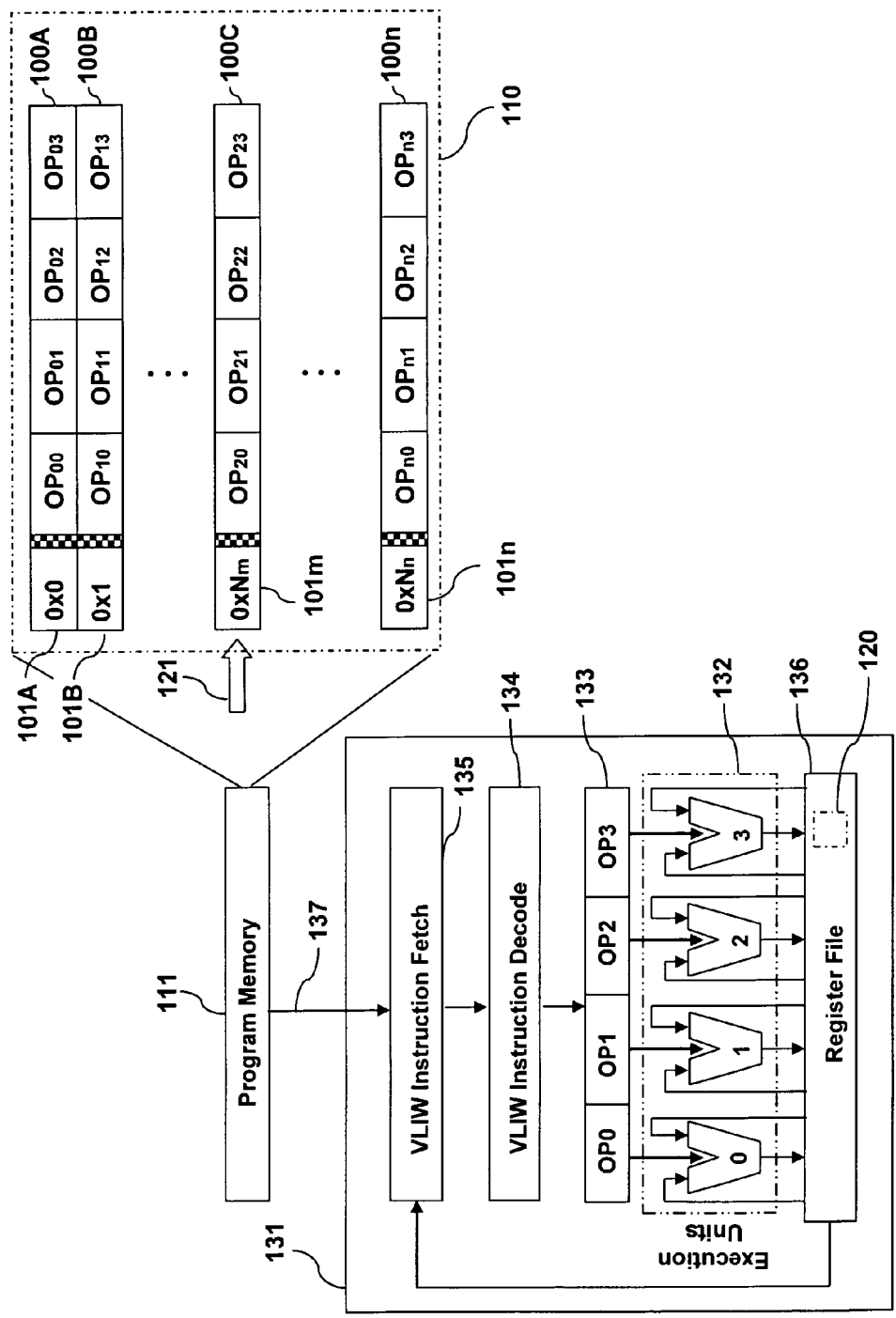
FIG. 3 is a schematic diagram of a prior art VLIW processor and associated memory map.
Figure 4:
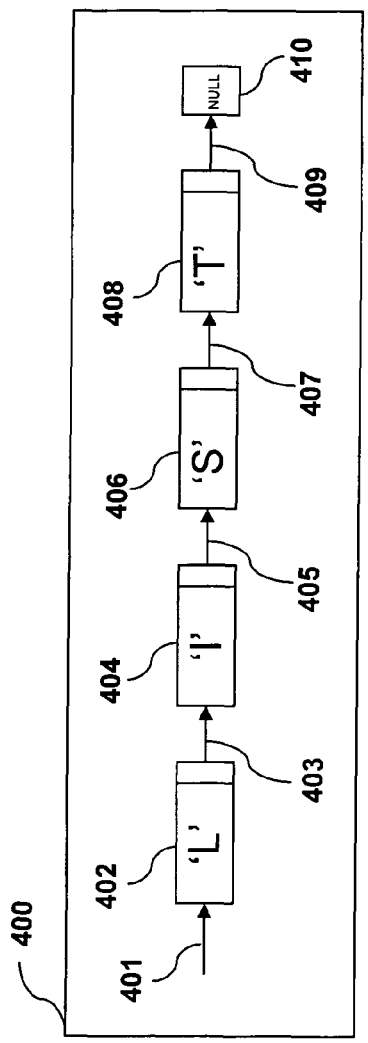
FIG. 4 is a diagram demonstrating a singly-linked list of the prior art.
Figure 5:
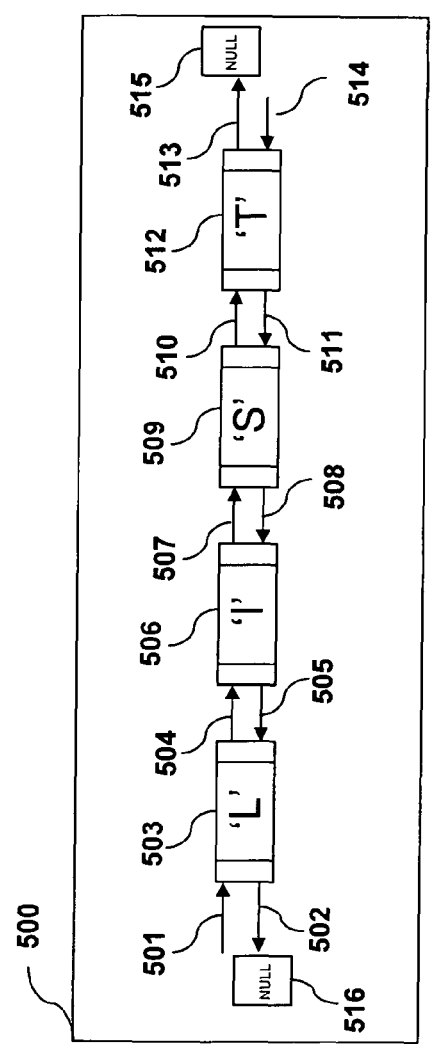
FIG. 5 is a diagram demonstrating a doubly-linked list of the prior art.
Figure 6:
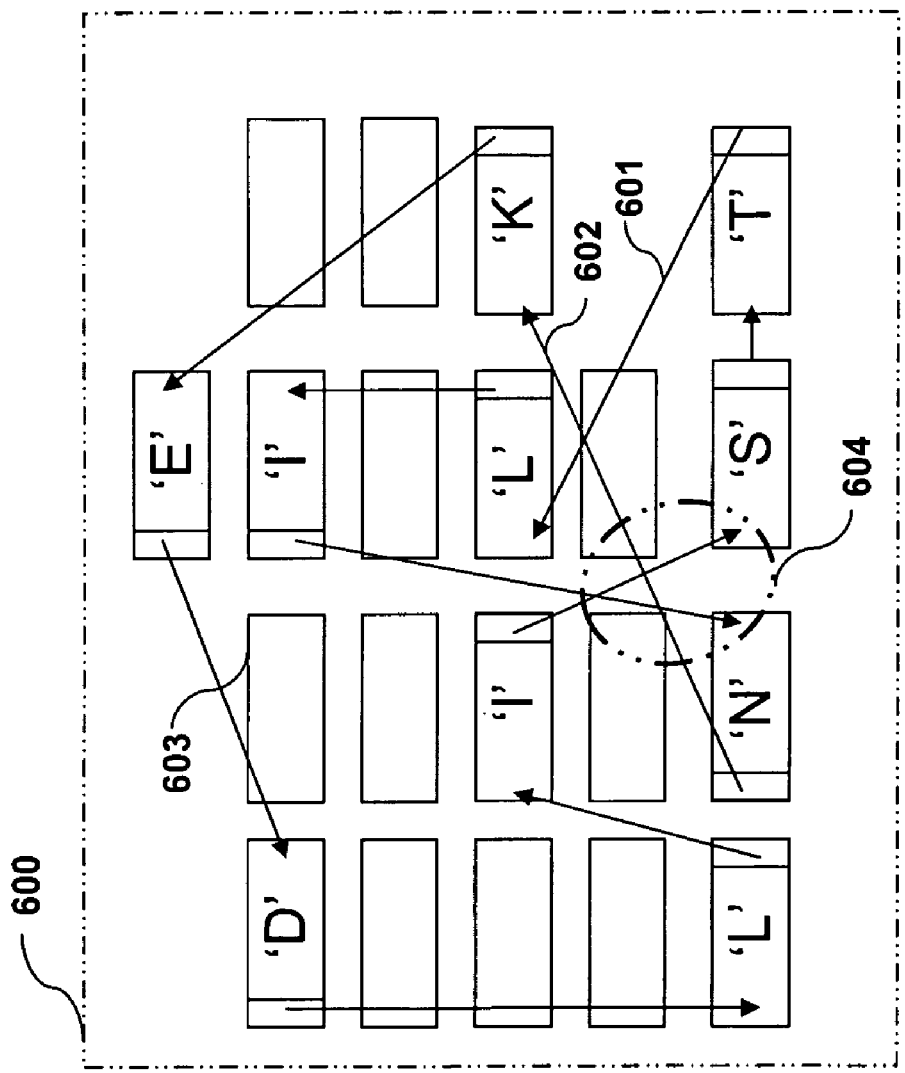
FIG. 6 is an arrangement of a prior art linked list that demonstrates how watermarks can be stored within the pointers of the linked list.
Figure 9:
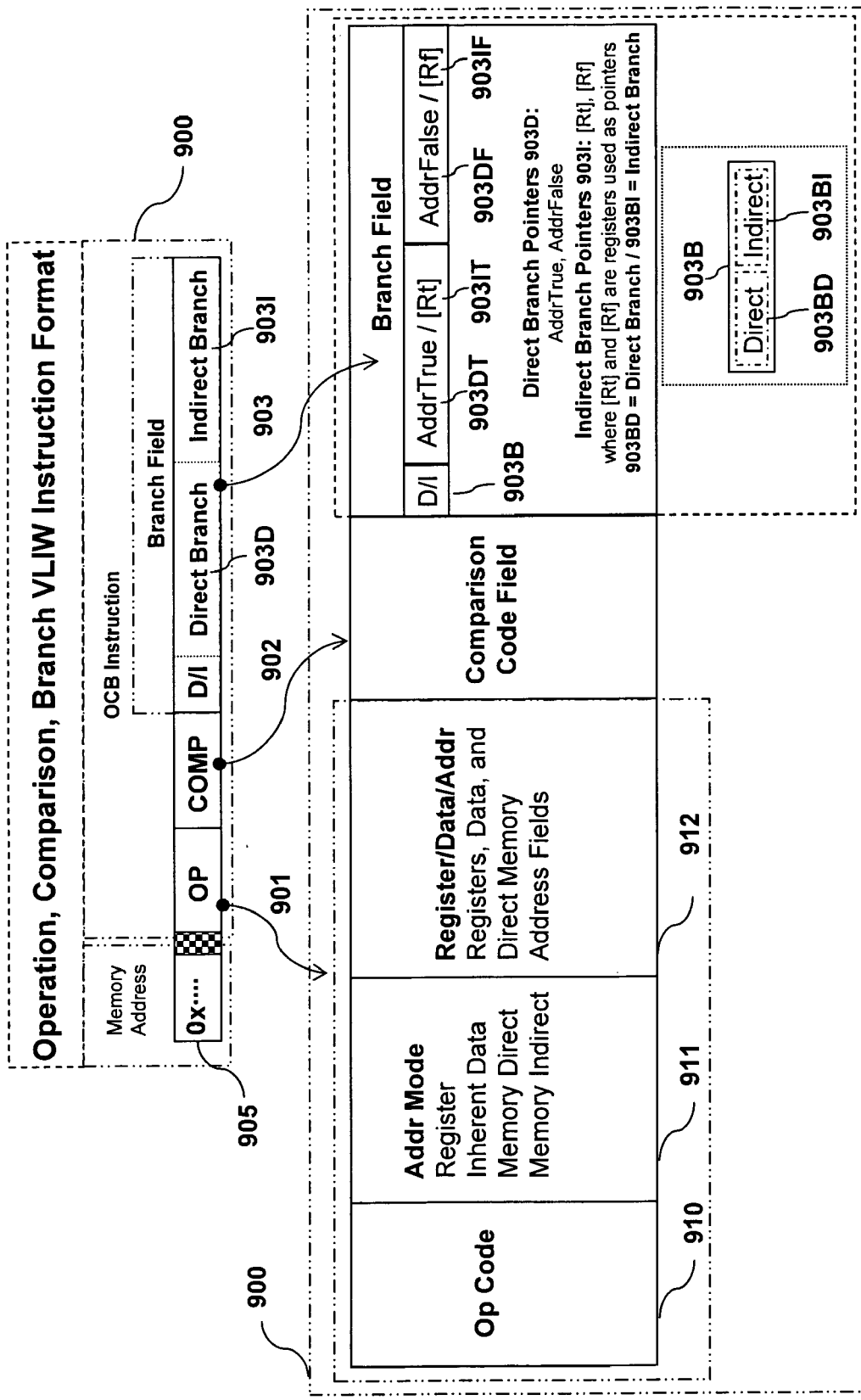
FIG. 9 is a block schematic diagram demonstrating the format according to the present invention of an Operation, Compare, Branch (OCB) VLIW instruction and the associated fields of machine code.

FIG. 9 describes the instruction format for a given OCB VLIW instruction 900 in accordance with the present invention. Each OCB VLIW instruction 900 is provided with fields for OP (operation code, addressing mode, etc.) 901, a comparison and branch code 902, and a branch field with two or more respective direct 903D and indirect 903I branch addresses. The OP field 901, comparison and branch code 902 and branch field 903 of OCB instruction 900 are located at memory address 905.

Figure 10:
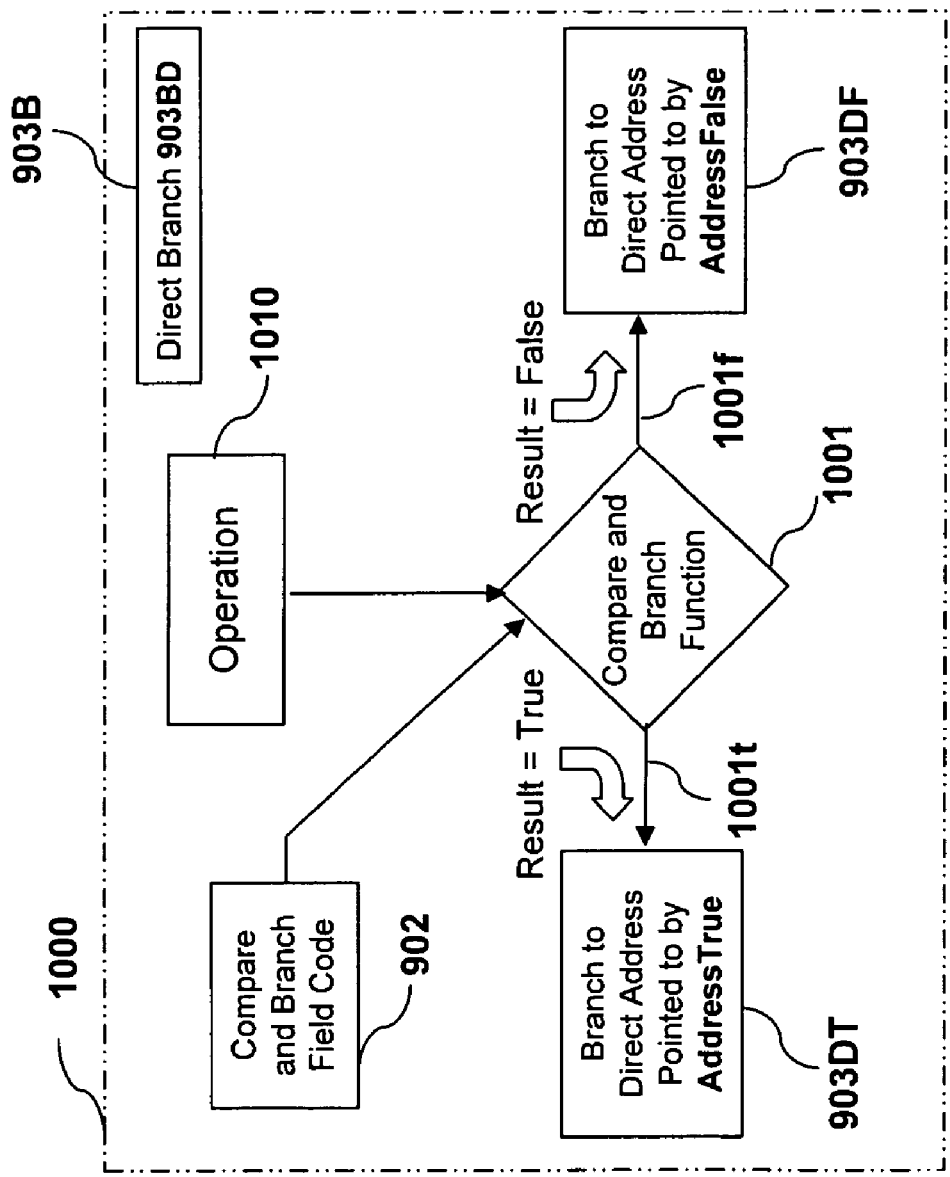
FIG. 10 is a flow diagram demonstrating operation, compare, branch, and next address operation for a direct branch mode function according to the present invention.
Figure 11:
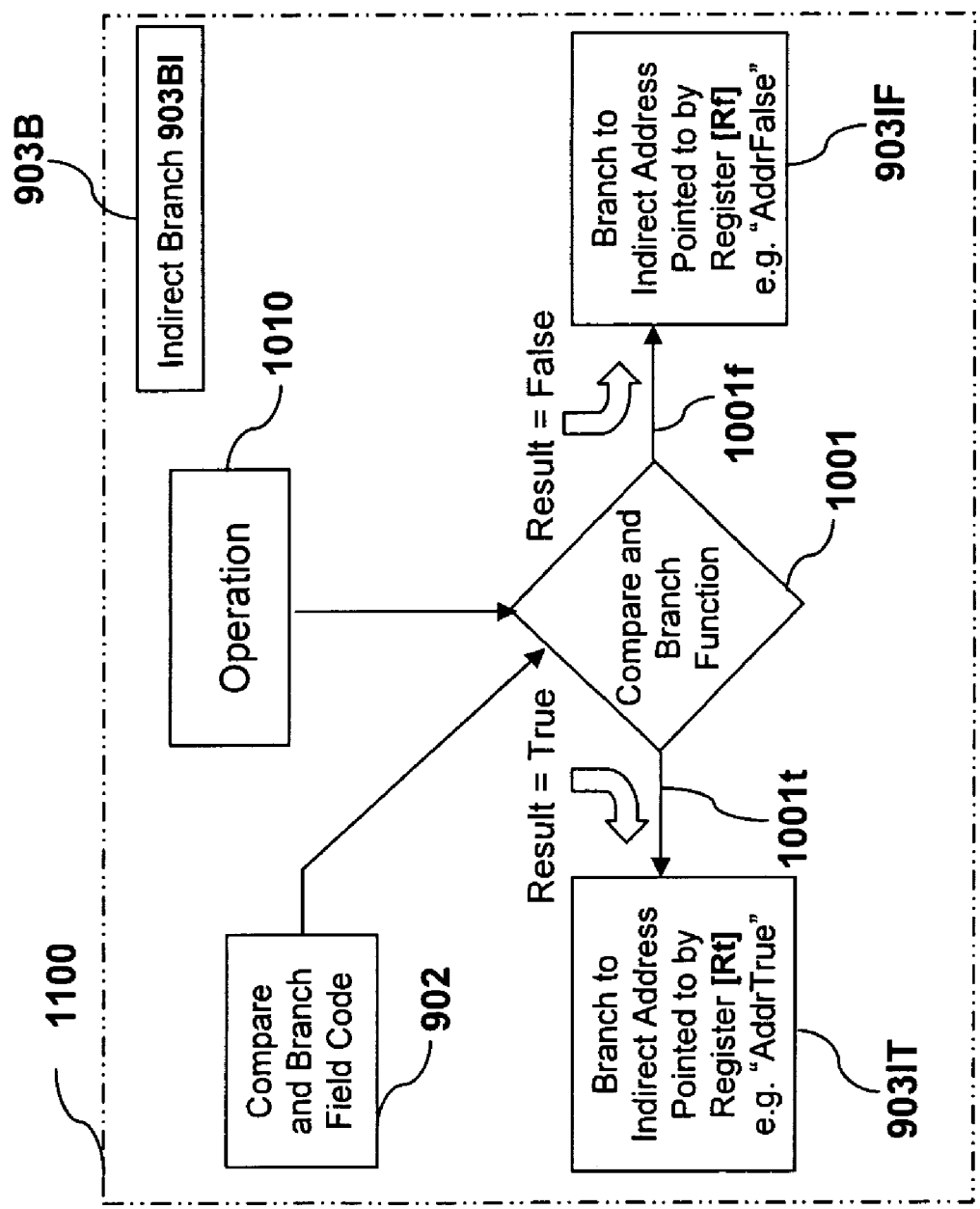
FIG. 11 is a flow diagram demonstrating operation, compare, branch, and next address operation for an indirect branch mode function according to the present invention.

The OP field 901 contains the operation code 910, addressing mode 911, and register/data/direct memory address field 912. The COMP field 902 contains the comparison and branch code 902 for the comparison and branch function 1001. The comparison and branch function 1001 selects the next execution addresses 903D for direct branch mode and addresses 903I for indirect branch mode. FIG. 10 and FIG. 11 illustrate a binary comparison. The comparison operation can be extended to a multi-bit output to allow for selecting from more than two possible branch addresses. FIG. 10 illustrates direct branch mode 903BD and FIG. 11 illustrates indirect branch mode 903BI.

FIG. 10 represents a flow diagram of the OCB instruction 900 with branch mode bit 903B set to direct branching mode 903BD. The output of the operation block 1010, implemented as execute circuitry 1312, is fed into the compare and branch function 1001 implemented as comparison circuitry 1316 and branch circuitry 1323. The compare and branch code 902 contains the programmed comparison function, e.g. greater than, equal, less than, etc. For a binary comparison operation, there are two possible results, true 1001t and false 1001f. For a true result 1001t, direct branch pointer AddrTrue 903DT is selected. If a result is false 1001f, direct branch pointer Addr-False 903DF is selected. The direct branch pointer then selects the next execution instruction.

In an alternative embodiment of the present invention in FIG. 11, an indirect branching operation can be employed in the present invention. FIG. 11 represents a flow diagram of the OCB instruction 900 with branch mode bit 903B set to indirect branching mode 903BI. The output of the operation function 1010, implemented as execute circuitry 1312, is fed into the compare and branch function 1001 implemented as comparison circuitry 1316 and branch circuitry 1323.

The compare and branch code 902 contains the programmed comparison function, e.g. greater than, equal, less than, etc. For a binary comparison operation, there are two possible results, true 1001t and false 1001f. For a true result 1001t, indirect branch pointer [Rt] 903IT is selected. If a result is false 1001f, indirect branch pointer [Rf] 903IF is selected. The registers [Rt] for "AddressTrue", and [Rf] for "AddressFalse" are indirect pointers where t and f are any valid register number. The indirect branch pointer then selects the next execution instruction.

Figure 12:
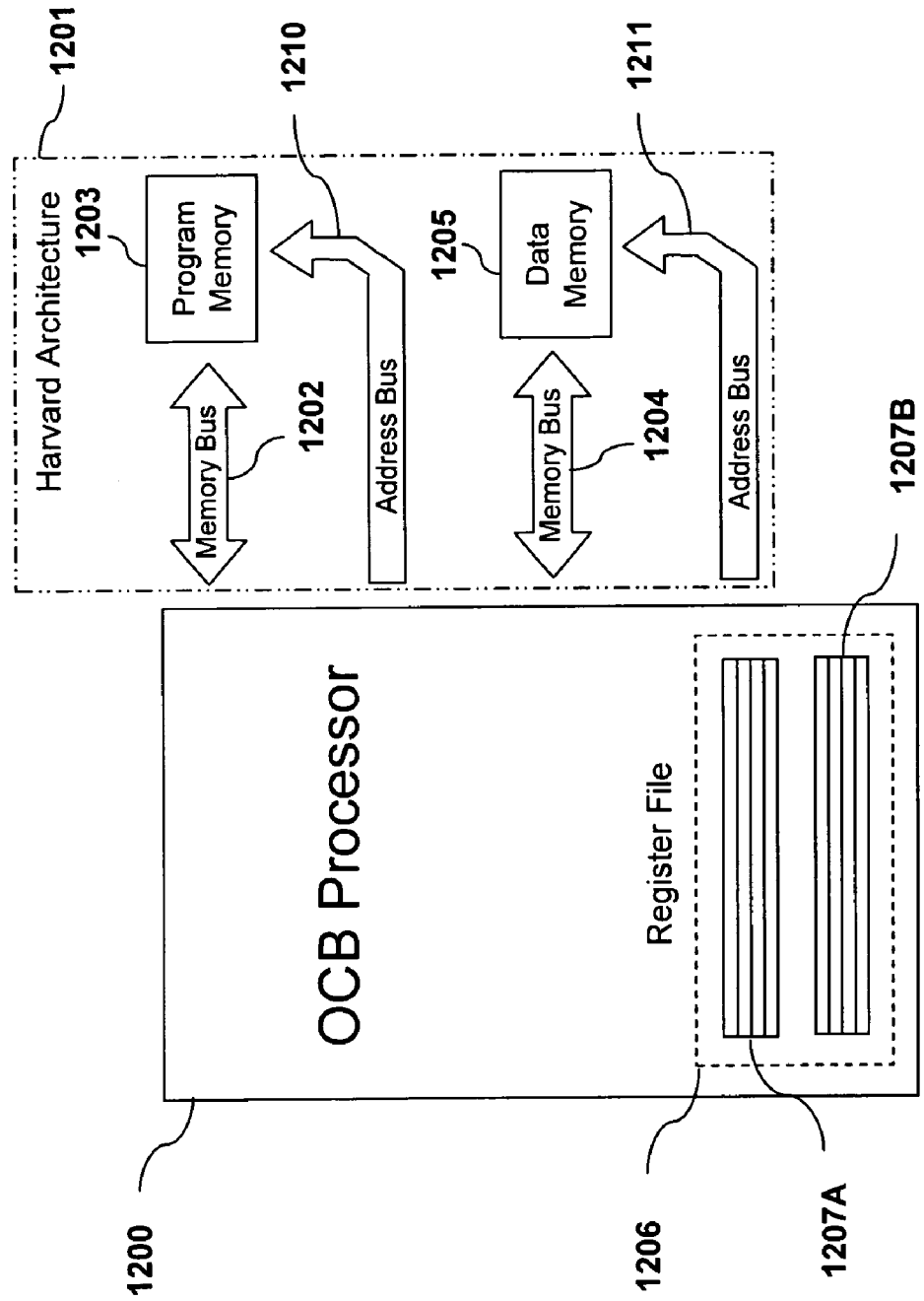
FIG. 12 is a schematic block diagram showing the Harvard architecture for the Operation, Compare, Branch (OCB) VLIW Processor of the present invention.

In FIG. 12, an OCB VLIW processor core 1200 according to the present invention utilizes a prior art Harvard computer architecture 1201 with a program memory bank 1203 and a data memory bank 1205. Program memory bus 1202 connects program memory bank 1203 to processor core 1200 and data memory bus 1204 connects data memory bank 1205 to processor core 1200. Address bus 1210 is used to select a memory address in program memory bank 1203. Address bus 1211 is used to select a memory address in data memory bank 1205. Address busses 1210 and 1211 connect to OCB processor 1200. The processor core 1200 contains register file 1206. The register file consists of two or more types of registers. An illustrative set of registers are general purpose registers 1207A and status registers 1207B. Additional register types are possible. Status registers 1207B are used to control interrupt features, flags, privilege levels, etc. in the OCB VLIW processor similar to a status register(s) found in prior art microprocessors.

Processor core 1200 processes the information contained in data memory bank 1205 in a conventional fashion known by the prior art. The OCB machine code instructions 900 contained in program memory bank 1203 are processed by processor core 1200 in accordance with the teachings of the present invention.

In today's technology, it is preferred that the OCB processor 1200 have a register file 1206 consisting of 16 to 128 registers with the preferred wordsize of 32 to 128 bits. The preferred range for the data memory bus 1204 connected to data memory bank 1205 is from 32 to 256 bits; and the preferred range of the program memory bus 1202 connected to program memory bank 1203 is from 128 to 512 bits. The preferred wordsize for OCB machine code instructions 900 is 128 to 512 bits. The preferred sizes for address busses 1210 and 1211 are in the range of 32 to 64 bits. Larger and smaller registers' wordsizes 1206, program memory bank 1203, data memory bank 1205, program memory bus 1202, data memory bus 1204, and address busses 1210 and 1211 bit widths are possible.

With reference to FIG. 13, the OCB processor core 1200 of the present invention has an execution pipeline 1310 and a fetch instruction pipeline 1320. The fetch instruction pipeline 1320 fetches OCB instructions from program memory bus 1202 using program memory address bus 1210 to address program memory bank 1203. The fetch instruction pipeline 1320 includes fetching circuitry 1321*f*, 1321*t*, 1322*t*, and 1322*f*, to fetch the OCB machine code instructions from program memory bank 1203.

The execution pipeline includes decoding circuitry 1311, executing circuitry 1312 and comparison 1316 and branch circuitry (latch 1323) which implements the compare and branch function 1001. The fetch instruction pipeline circuitry 1320 is connected to latching circuitry 1323. The latching circuitry is connected to decoding circuitry 1311 of the execution pipeline 1310. The decoding circuitry is connected to executing circuitry 1312 which connects to comparison circuitry 1316. The decoding circuitry 1311 contains, decoding circuitry for addressing mode 1311A, for operation code 1311B, and for comparison function 1311C.

The executing circuitry 1312 in FIG. 14 includes an arithmetic logic unit (ALU) circuitry 1312A, register operation circuitry 1312B, memory access circuitry 1312C to access the data memory bank 1205, and a random number generator circuitry 1312D. The comparison circuitry 1316 is connected to latching circuitry 1323. The execution circuitry 1312 has a connecting output to register file 1206 and register file 1206 has connecting outputs to decoding circuitry 1311 and executing circuitry 1312. The register file 1206 has a connecting output to register operation 1321*f* and register operation 1321*t*. Register operations 1321*f* and 1321*t* connect to the program memory bank's 1203 address bus 1210. Next instruction latches 1322*f* and 1322*t* have an input connection from program memory bank 1203 through program memory bus 1202. Execute stage 1312 has an address bus 1211 output connection and a data bus input/output connection 1204 to data memory bank 1205.

Figure 15:
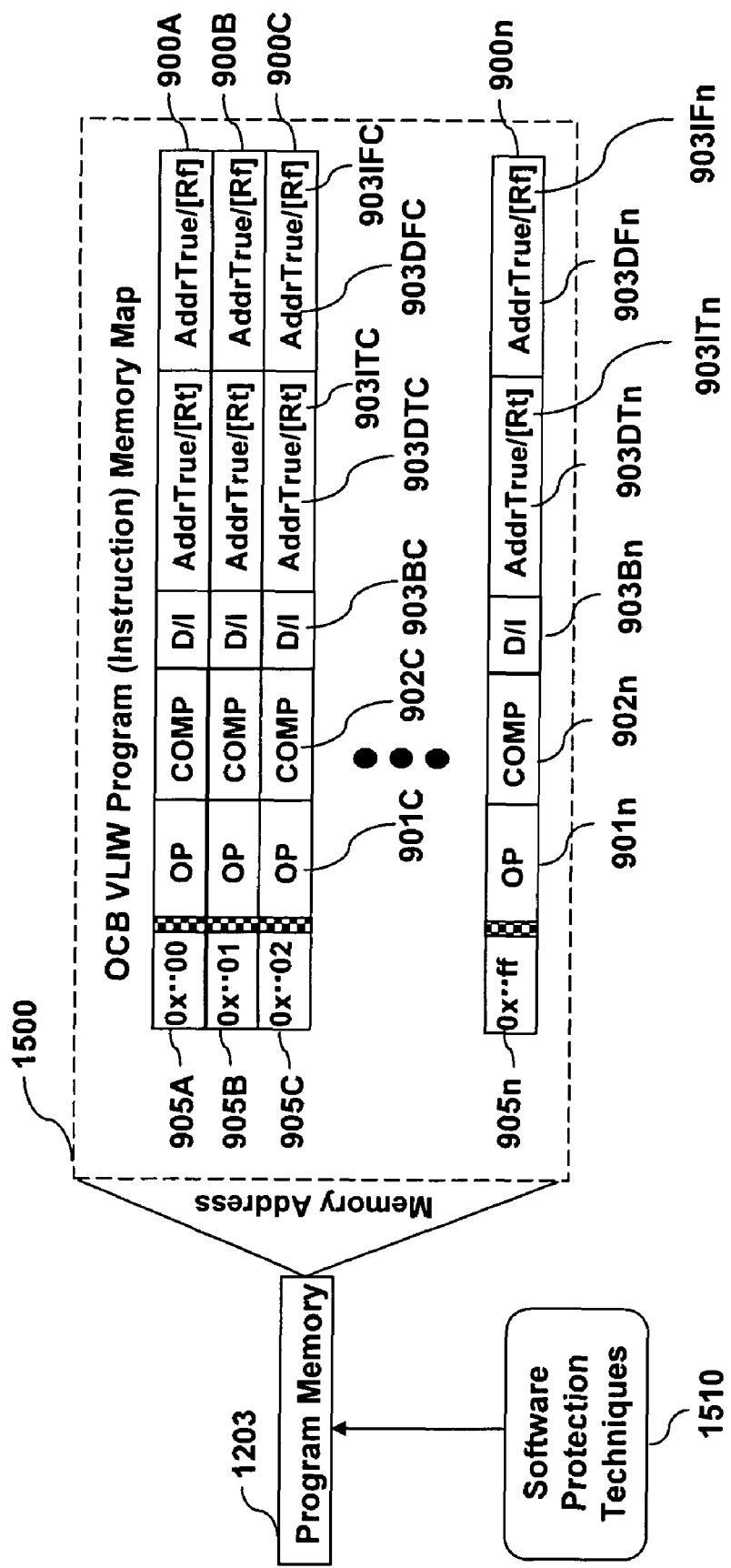
FIG. 15 is block diagram of an OCB VLIW instruction memory map according to the present invention.

With reference to FIG. 15, program memory bank 1203 is organized as illustrated by the OCB VLIW program instruction memory map 1500. Memory map 1500 contains a plurality of OCB VLIW instructions 900. The OCB instructions 900 are stored at memory addresses 905. Memory address 905A is the lowest program memory address and 905n is the highest memory address. OCB instructions 900A, 900B, 900C, etc. are stored sequentially at program memory addresses 905A, 905B, 905C, etc. Techniques similar to prior art software protection tools 1510 apply software protection to OCB computer software at the source code and/or binary levels.

As illustrated by the OCB instruction at memory address 905C, the OCB fields are referenced as OP field 901C, COMP field 902C, branch mode field 903BC, direct branch pointers 903DTC and 903DFC, and indirect branch pointers 903ITC and 903IFC. The notation is used sequentially from the lowest memory address to the highest memory address.

As related above, processor core 1200 has an instruction fetch pipeline 1320 and an execution pipeline 1310. Instruction fetching pipeline 1320 has fetch instruction circuitry for fetching the next two possible OCB instructions. Fetch circuitry 1321*t* and fetch circuitry 1321*f* are connected to program memory address bus 1210 to access program memory bank 1203. For indirect addressing mode 903BI, register operations 1221*t* and 1221*f* resolve indirect branch addresses contained in registers [Rt] 903IT and [Rf] 903IF. For direct addressing mode, bit 903B is set to direct branch 903BD; the register operations, 1221*t* and 1221*f*, copy the inputs to the outputs. Register operation 1321*t* contains the direct/indirect address for "AddressTrue." Register operation 1321*f* contains the direct/indirect address for "AddressFalse."

For an OCB instruction fetched by direct branch mode 903BD, for a true result from the comparison circuitry 1316; address AddrTrue 903DT is transferred by register operation 1321*t* to the program memory address bus 1210 to fetch the OCB instruction for "AddressTrue." Latch 1322*t* reads in the "AddressTrue" OCB instruction from program memory 1203 through program memory bus 1202. Address AddrFalse 903DF is transferred by register operation 1321*f* to the program memory address bus 1210 to fetch the OCB instruction for "AddressFalse." Latch 1322*f* reads in the "AddressFalse" OCB instruction from program memory bank 1203 through program memory bus 1202.

For an OCB instructions fetched by indirect branch mode 903BI, for a true result from the comparison circuitry 1316, indirect branch contained in [Rt] 903IT is processed by register operation 1321*t* to access the program memory address bus 1210 to fetch the OCB instruction for "AddressTrue=[Rt]." Latch 1322*t* reads in the "AddressTrue" OCB instruction from program memory 1203 through program memory bus 1202. Indirect address [Rf] 903IF is processed by register operation 1321*f* to access the program memory address bus 1210 to fetch the OCB instruction for "AddressFalse=[Rf]." Latch 1322*f* reads in the "AddressFalse" OCB instruction from program memory 1203 through program memory bus 1202.

A finite state machine can mapped into an OCB VLIW program of the present invention. This is demonstrated by mapping the states in the finite state machine into OCB instructions and mapping the state transitions to the pointers (AddrTrue and AddrFalse, or [Rt] and [Rf]) contained in the branch field 903 as illustrated in FIG. 16 and FIG. 17.

Figure 16:
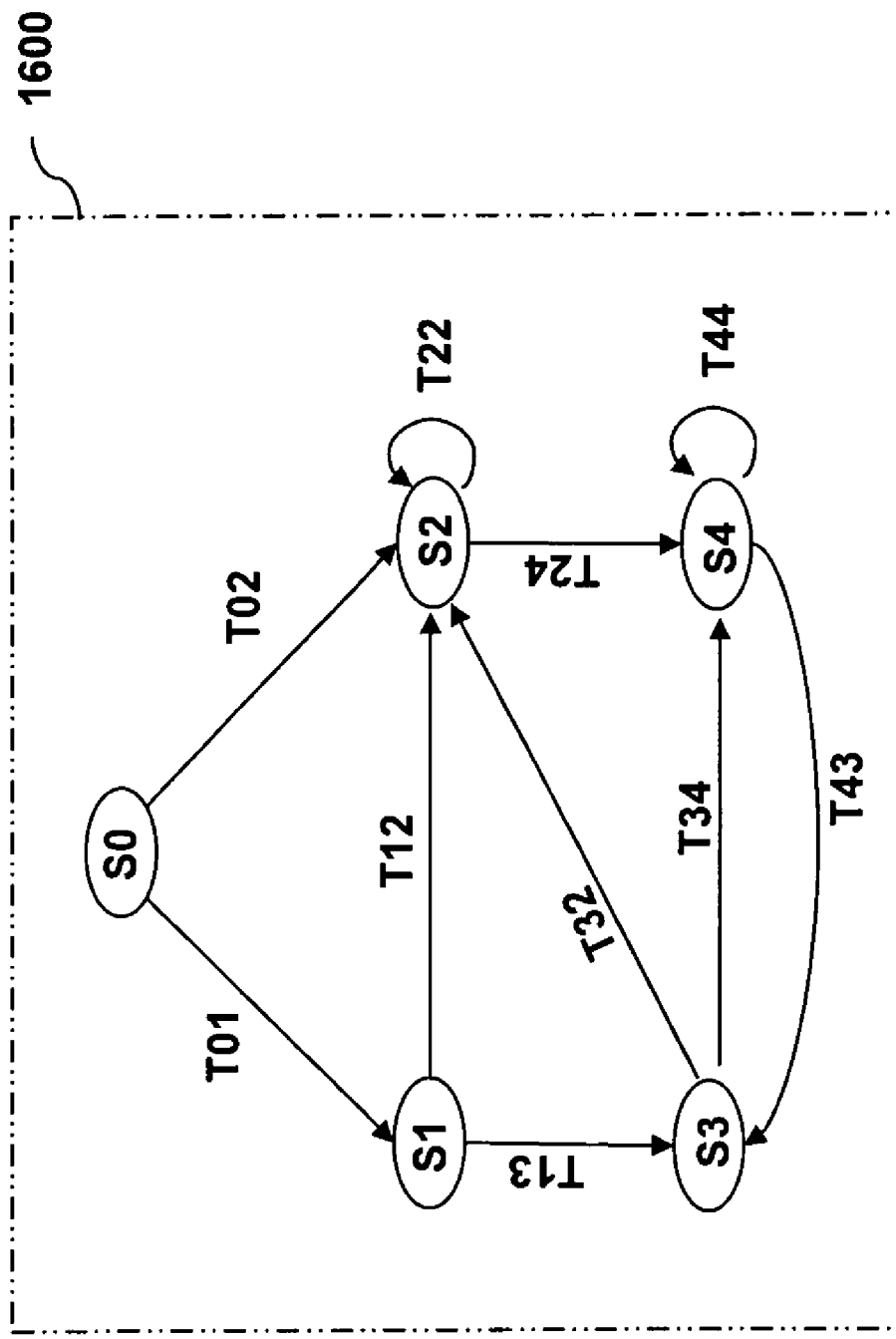
FIG. 16 is a prior art state machine diagram.

In FIG. 16, a simple 5 state finite state machine 1600 is illustrated. States are labeled sequentially S0, S1, S2, S3, and S4. The state transition T01 is a transition from S0 to S1. The state transition is shown by the letter 'T' followed by the 'from state' to the 'to state.' All other state transitions in FIG. 20 follow this format.

Figure 17:
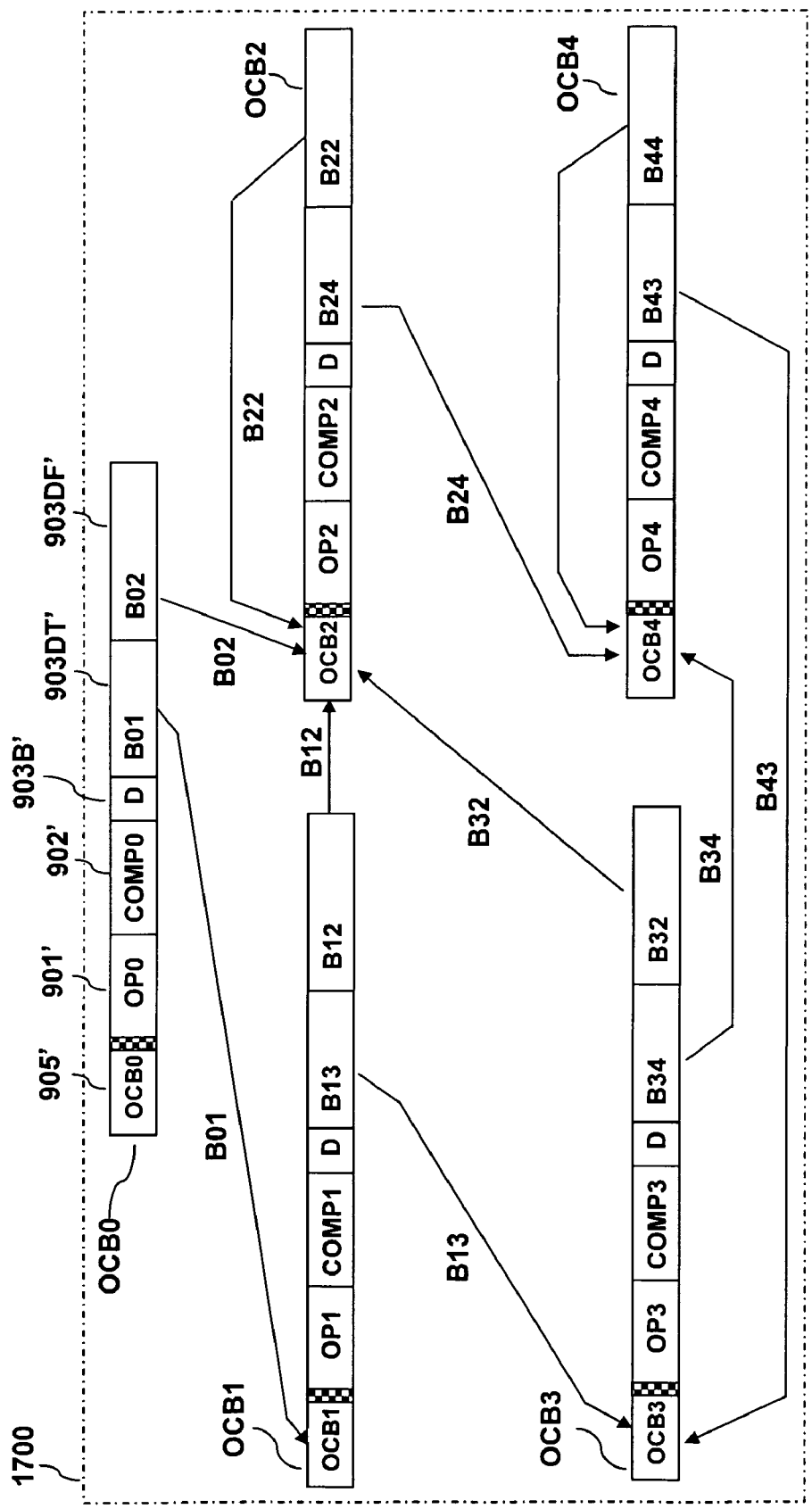
FIG. 17 shows a plurality of OCB VLIW instructions, in accordance with the present invention, which when compared with FIG. 16 demonstrate that OCB VLIW instructions of the present invention can be easily mapped to a finite state machine.

The state transition diagram 1600 from FIG. 16 is mapped into the OCB program 1700 in FIG. 17. A simple mapping of the state numbers S0, S1, S2, S3, and S4 to the OCB instructions OCB0, OCB1, OCB2, OCB3, and OCB4 illustrates how a state transition diagram can be mapped to the OCB program 1700. OCB instructions OCB0, OCB1, OCB2, OCB3, and OCB4 are stored at program memory addresses OCB0, OCB1, OCB2, OCB3, and OCB4 respectively. State transitions, T01, T02, etc. are directly mapped to OCB pointers labeled B01, B02, etc. B01 represents a pointer from OCB0 to OCB1. All other pointers follow this mapping. More complex mappings from a finite state machine to an OCB program are possible.

To demonstrate the operation of the OCB VLIW processor of the present invention, a simulation was conducted for an 8-bit OCB VLIW processor. FIG. 18 is an illustrative instruction set and FIG. 19 is illustrative table of comparison operations for the simulated 8-bit processor. It is realized that other instruction sets and comparison and branch operations are possible.

With reference to FIG. 20 and FIG. 21, for the simulated OCB processor, four addressing modes and four instruction types were used. The addressing modes 911 were: (1) register, (2) inherent data, (3) direct memory, and (4) indirect memory. The instruction types used were: (1) two argument, (2) single argument, (3) load, and (4) store. The two branch modes 903B were: (1) direct 903BD, and (2) indirect 903BI.

For direct branch 903BD, the branch addresses are contained in the OCB instruction. For indirect branch 903BI, registers are used as indirect pointers. The term "CMP" indicates a comparison function as illustrated in FIG. 19. The assembly language instructions 'ADD', 'NEG', 'LD', and 'ST' represent the four instruction types as shown in FIG. 20 and FIG. 21: (1) two argument, (2) single argument, (3) load, and (4) store. The assembly language instructions in FIG. 20 and FIG. 21 are for illustrative purposes and do not limit the instruction set for the OCB processor. The registers in the example assembly language instructions are shown by R0, R1, R2, etc. In FIG. 20 and FIG. 21, register R0 contains the results for the OCB assembly language instruction. Registers R1, and R2 are used to show operands for the assembly language instruction.

Figure 22:
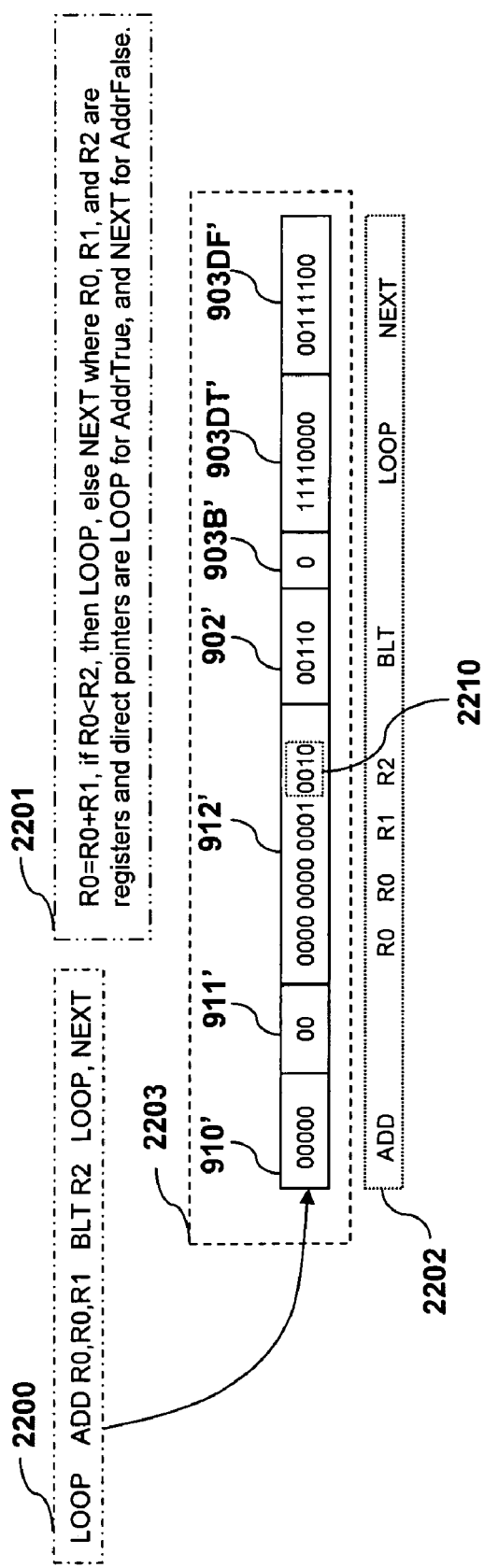
FIG. 22 is a block diagram which illustrates the mapping from an OCB assembly language instruction to binary machine code.

All four instruction types contain a field inside OCB field register/data/address field 912 for a comparison register as illustrated in FIG. 20 and FIG. 21. FIG. 22 shows the OCB machine code 2203, and the comparison register 2210 used by the comparison circuitry 1316 for OCB assembly language instruction 2200. The comparison register, used by the comparison circuitry 1316 to select the next execution address, is R3 in FIG. 20 and FIG. 21.

The registers 1206, for indirect branch mode, are used as indirect branch pointers for two or more next addresses. The registers R0, R1, R2, R3, R5, and R6 are used for illustrative purposes. OCB assembly instructions are not limited by the register assignments shown in FIG. 20 and FIG. 21.

The comparison register number, contained in OCB instruction field 912, is used by comparison circuitry 1316. Illustrative comparison and branch examples are found in FIG. 19. The next address pointers are found in branch field 903. For direct branch mode 903BD, the direct branch addresses AddrTrue 903DT, and AddrFalse 903DF, are contained in OCB branch field 903. For indirect branch mode 903BI, the numbers for two registers, [Rt] 903IT and [Rf] 903IF are contained in the branch field 903. [Rt] indirectly points to the address for "AddrTrue" and [Rf] indirectly points to the address for "AddrFalse". The branch mode bit 903B sets the branch mode: direct branch 903BD or indirect branch 903BI.

With reference to Line_10 to Line_13 in FIG. 20, the four OCB assembly language statements describe the four addressing modes for two argument arithmetic and logic instructions for direct branch mode 903BD. Line_10 illustrates register addressing mode 911 where the registers 1206, R0, R1, and R2 are stored inside OCB field 912. For Line 10, R0=R1+R2. Line_11 illustrates inherent data addressing mode 911 where the registers 1206, R0, and R1 and the integer given by #data are stored inside the OCB field 912. For Line_11, R0=R1+#data. Line_12 illustrates direct memory addressing mode 911 where registers 1206, R0, and R1, and a direct data memory bank 1205 address are contained in OCB field 912.

For Line_12, R0=R1+(Mem) where (Mem) is the contents of data memory bank 1205 at data memory address Mem. Line_13 illustrates indirect memory access addressing mode 911 where registers 1206, R0, R1, and R2 are stored inside the OCB field 912. For Line_13, R0=R1+[R2] where [R2] is an indirect memory pointer to data memory address [R2] contained in data memory bank 1205. Register R3 (see FIG. 22, register field 2210 for an example) illustrates the register used by the comparison circuitry 1316, to select the direct branch pointer to AddrTrue 903DT or AddrFalse 903DF.

In FIG. 20, single argument OCB instructions follow the two argument instructions. Line_20 illustrates register addressing mode 911 where the registers 1206, R0, and R1 are stored inside OCB field 912. For Line_20, R0=-R1. Line_21 illustrates inherent data addressing mode 911 where the registers 1206, R0, and the integer given by #data are stored inside the OCB field 912. For Line_21, R0=-#data. Line_22 illustrates direct memory access addressing mode 911 where registers 1206, R0, and a direct data memory address are contained in OCB field 912. For Line_22, R0=-(Mem) where (Mem) is the contents of data memory bank 1205 at data memory address Mem. Line_23 illustrates indirect memory access addressing mode 911 where registers 1206, R0, and R2 are stored inside the OCB field 912. For Line_23, R0=-[R2] where [R2] is an indirect memory pointer to data memory address [R2] contained in data memory bank 1205. Register R3 illustrates the register used by the comparison 1316, to select the direct branch pointer to AddrTrue 903DT or AddrFalse 903DF.

The load instructions in Line_31 to Line_33 (FIG. 20) follow the same format as the single argument arithmetic and logic instructions in Line_21 to Line_23. For register addressing mode 911, Line_30, is a register copy operation, e.g. R0=R1. For Line_31 inherent data addressing mode 911, register R0=#data. For Line_32, direct memory data addressing mode 911, register R0=(Mem) where (Mem) is the contents of data memory bank 1205 at data memory address Mem. For Line_33, indirect memory data addressing mode 911, register R0=[R2] where register [R2] is an indirect memory address pointer to data memory bank 1205.

The store instructions in FIG. 20, Line_42 to Line_43 follow the same format as the single argument arithmetic and logic instructions in Line_22 to Line_23. Line_40 is a register copy operation where R0 is copied into R1, e.g. R1=R0 (reverse of load instruction in Line_30). Line_41 could be used to store a number in the data field allowing for self modifying code. The string "\data" is a token used to refer to the inherent data field 912 inside an OCB VLIW instruction word. The store instructions in Line_42 and Line_43 follow the load instructions in Line_32 to Line_33.

With reference to FIG. 21 for indirect branch mode 903BI follows direct branch mode. In indirect branch mode 903BI, registers are used as indirect branch pointers for the two or more next addresses, e.g. for two next addresses: "AddrTrue"=[Rt] 903IT and "AddrFalse"=[Rf] 903IF. The registers can be any valid register. The instruction ADD R0,R0,R0 BLT R0, [R0],[R0] is a valid register addressing mode 911 with indirect branching 903BI, [R0],[R0], instruction.

FIG. 22 illustrates the mapping form OCB assembly language statement 2200 to binary machine code 2203. The line of assembly code in pseudo code is R0=R0+R1, if R0<R2, then LOOP, else NEXT where R0, R1, and R2 are registers and direct pointers are LOOP for AddrTrue 903DT, and NEXT for AddrFalse 903DF. The binary fields in 910', 912', 902', 903DT' and 903DF' are compared to the line of assembly code 2200 in textbox 2202. The assembly language instruction ADD is mapped to the operation code 910'. Register addressing mode is mapped into the addressing mode field 911'. Field 912' contains the register numbers for register addressing mode 911. Field 902' is the comparison code field 902. Branch mode field 903B' is set to direct branch mode 903BD for branch mode field 903B. Field 903DT' contains the direct branch address AddrTrue 903DT for LOOP. Field 903DF' contains the direct branch address AddrFalse 903DF for NEXT. The field in 2210 is the register number used by comparison circuitry 1316. In 2200, if register R0 is less than register R2, e.g. R0<R2, then LOOP 903DT', else NEXT 903DF'. LOOP and NEXT form the linked list connecting the OCB instructions together. The instruction fetch pipeline 1320 reads in the instructions at program memory addresses LOOP and NEXT. Latch 1323 selects the appropriate next instruction to execute based on the results of the comparison circuitry 1316. For a true result 1001*t*, the next instruction to execute is located a program memory address LOOP 903DT'. For a false result 1001*f*, the next instruction to execute is located at program memory address NEXT 903DF'.

An unique branch operation which can be employed by the OCB processor of the present invention is the branch on random (BRN), branch condition from FIG. 19.

Figure 23:
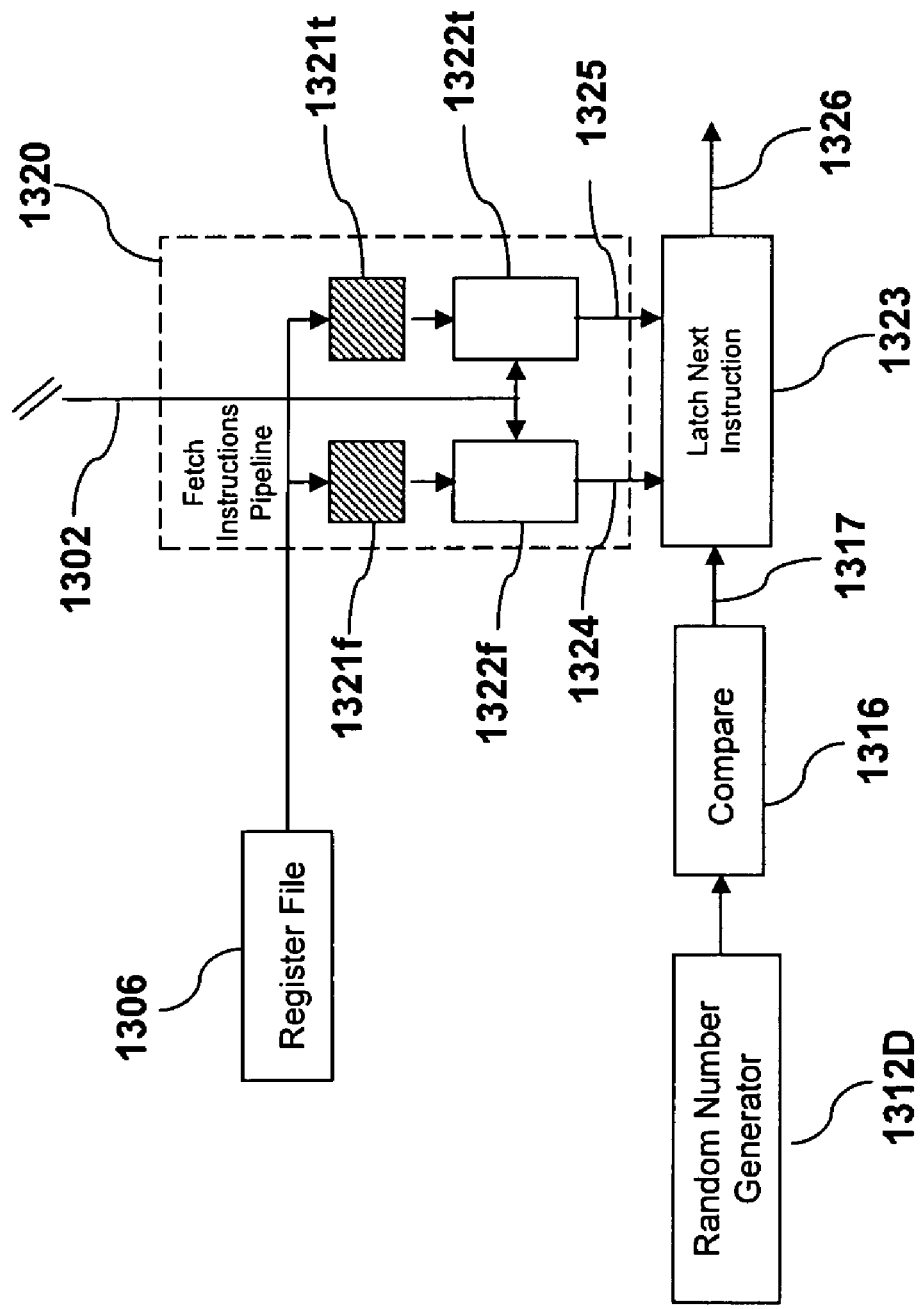
FIG. 23 is schematic block diagram for the branch on random (BRN) branching operation of the OCB processor according to the present invention.

With reference to FIG. 23, a random number generator 1312D generates a random number. A binary random number generator is used to illustrate the operation of the BRN operation. The binary random number is fed through the comparison circuitry 1316. The compare circuitry 1316 is programmed such that the input is simply copied to the output. The output from the compare circuitry 1316 is used by latch 1323 to latch the next OCB instruction to execute. The instruction fetch pipeline 1320, for direct branch mode 903BD fetches the OCB instructions at direct branch addresses AddrTrue/AddrFalse 903D, and for indirect branch mode 903BI fetches the OCB instructions at indirect branch addresses [Rt]/[Rf] 903I. Branch mode 903B bit contains the flag for direct branch mode/indirect branch mode. Thus, the next execution instruction 1326 is randomly selected from the OCB instructions 1324 and 1325.

Figure 24:
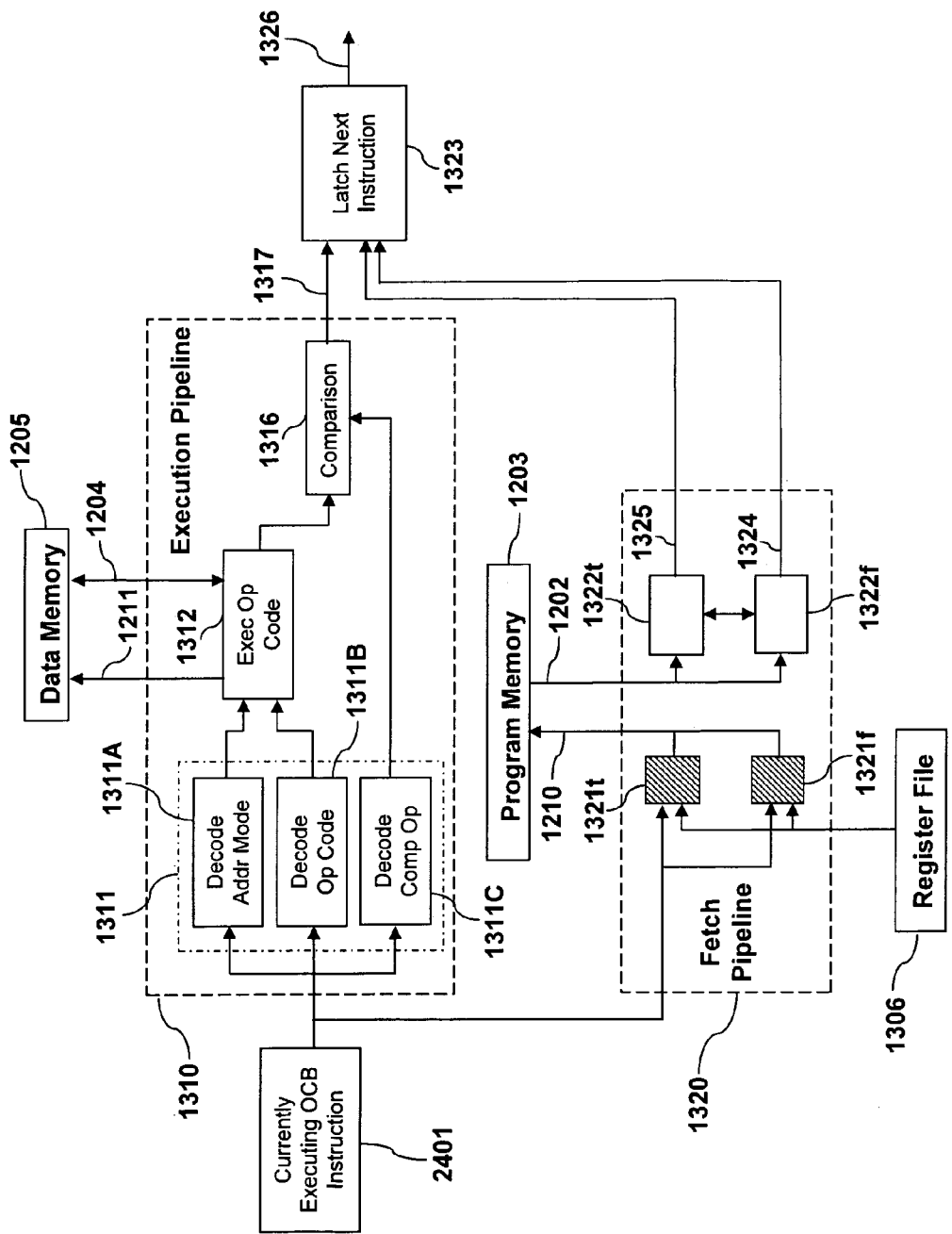
FIG. 24 describes the execution pipeline and fetch pipeline utilized in the simulation of the OCB VLIW processor according to the present invention.

In FIG. 24, a pipeline microprocessor architecture illustrates the execution pipeline 1310 and fetch pipeline 1320 for the simulated 8-bit OCB processor in accordance with the present invention. The fetch pipeline 1320 reads in the two next possible instruction addresses at direct branch addresses 903D, AddrTrue 903DT and AddrFalse 903DF, or indirect branch 903I pointed to by registers 1206, [Rt] 903IT and [Rf] 903IF. The execution pipeline 1310 handles the instruction decoding in decode stages 1311A, 1311B, and 1311C.

The execution pipeline 1310 executes the processed OCB instruction in execution circuitry 1312. The arithmetic and logic (ALU) operations are processed inside execute stage 1312 by ALU 1312A. The comparison circuitry 1316 provides the select signal 1317 to latch 1323 to latch OCB instruction 1325 or OCB instruction 1324 to execute next. Instruction fetch pipeline 1320 determines the branch mode based on the branch mode bit 903B. For direct branch mode 903BD, the instruction fetch pipeline outputs the two OCB instructions 1325 and 1324 from direct addresses 903DT for AddrTrue and 903DF for AddrFalse from program memory bank 1203.

For indirect branch mode 903BI, the instruction fetch pipeline resolves indirect addressing by register operations 1321*t* and 1321*f*. For indirect branch mode 903BI, the instruction fetch pipeline 1320 outputs the two OCB instructions 1325 and 1324 from indirect addresses 903IT for [Rt] and 903IF for [Rf] from program memory bank 1203.

Figure 25:
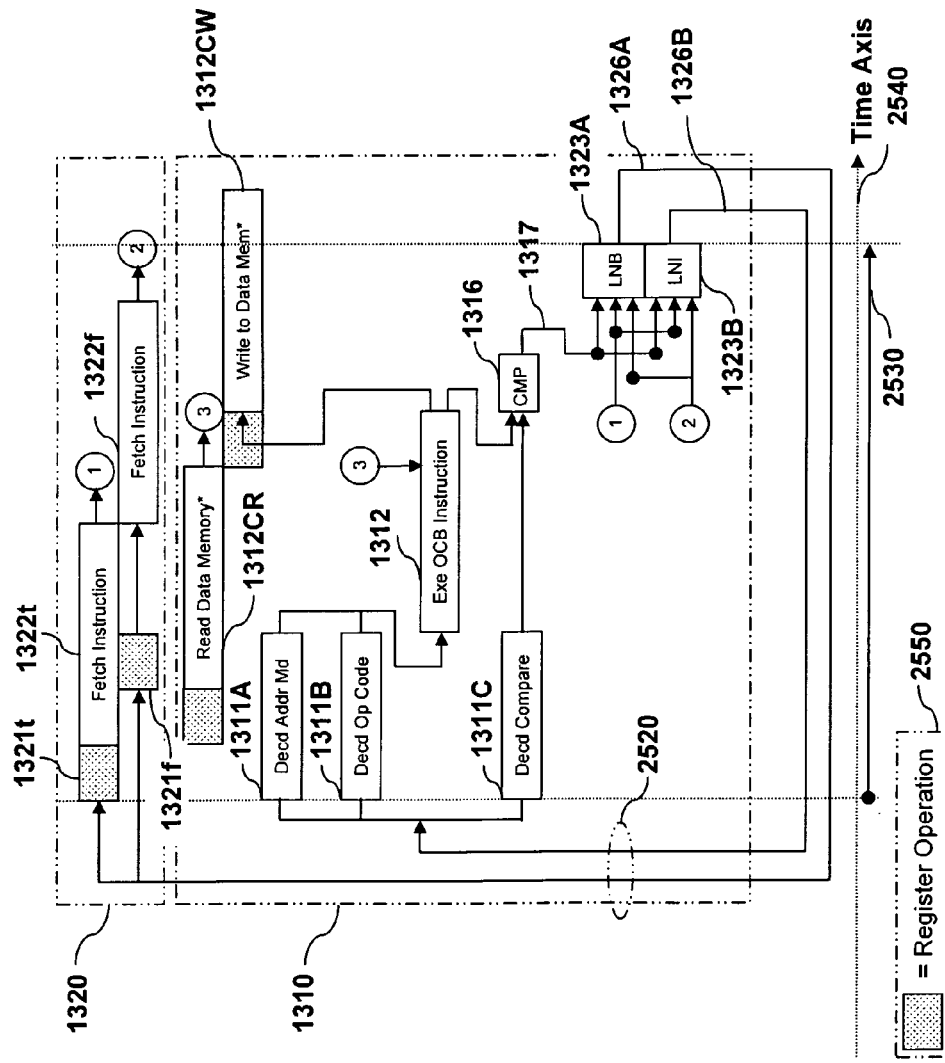
FIG. 25 presents a detailed Timing Diagram for a simulation of the OCB VLIW processor according to the present invention.

In FIG. 25, the distance along the horizontal axis represents time 1740. Optimizations are possible using prior art associative caching techniques, higher performance memory and tuning the pipeline structure. The goal is to align the fetch instruction pipeline 1320 with the execution pipeline 1310 so the next instruction 1326 was selected just prior to next instruction cycle start point 2520. The positions and processing times for the rest of the elements in execution pipeline 1310 are not critical.

The register operation 1321*t* resolves indirect addressing, for indirect branch mode 903BI, if required. The fetch instruction unit 1322*t* fetches the OCB machine code instruction pointed to by direct address pointer AddrTrue 903DT or indirect address pointer [Rt] 903IT. The register operation 1321*f* resolves indirect addressing, for indirect branch mode 903BI, if required. The fetch instruction unit 1322*f* fetches the OCB machine code instruction pointed to by direct address pointer AddrFalse 903DF or indirect address pointer [Rf] 903IF.

The read data memory 1312CR and write data memory 1312CW are read and write operations to data memory bank 1205. The timing requirements for the read data memory 1312CR and write data memory 1312CW operations are similar to the timing requirements for the instruction fetch pipeline.

Still with reference to FIG. 25, each of the n fetches in fetch instruction pipeline 1320 has an index, i, associated with it. For fetch instruction unit 1322*t*, *the index i*=0. For fetch instruction 1322*f*, the index i=1. Other assignments for the indices, i's, are possible.

The non-dependent decoding operations: decode addressing mode in circuitry 1311A, decode op code in circuitry 1311B, and decode comparison function in circuitry 1311C, are run in parallel. The addressing mode 911 is decoded in circuitry 1311A (FIG. 20 and FIG. 21). The operation code 910 is decoded in decode circuitry 1311B. The comparison code 902 is decoded in decode comparison code circuitry 1311C.

The comparison circuitry 1316 outputs an index number 1317, 0 to (n−1), where n is the number of possible next OCB machine code instructions that were fetched by the instruction fetch pipeline 1320. For FIG. 25 two instruction fetches are shown, e.g. n=2. The index number, i, 1317 is used to select the next instruction to execute. For i=0 (direct pointer AddrTrue 903DT or indirect pointer [Rt] 903IT), the next instruction is contained in 1322*t*. For i=1 (direct pointer AddrFlase 903DF or indirect pointer [Rf] 903IF), the next instruction is contained in 1322*f*.

The Latch next instruction (LNI) block in 1323B latches the next instruction, excluding the branch field 903, from latch 1322*t for i*=0 or from latch 1322*f* for i=1. The latch next branch (LNB) in 1323A latches the branch field from the next instruction from latch 1322*t* for i=0 or latch 1322*f* for i=1. For latch 1323A and latch 1323B, at power up, the first instruction to execute must be loaded into the LNB and LNI latches.

The latch LNB 1323A is used by the Fetch Instruction Pipeline in 1320 to load the next two possible next execution instructions into latches 1322*t* and 1322*f*. The latch LNI in 1323B latches the next instruction to execute for the execution pipeline in 1310.

OCB instruction cycle time 2530 points out the time required for the simulated OCB processor to execute one OCB instruction. In 1323A and 1323B, at power up, the first instruction to execute must be loaded into the LNB and LNI latches. The loop back, to process the next instruction, is shown by instruction cycle start 2520. A register read or write operation is shown by 2550.

The direct pointers AddrTrue 903DT and AddrFalse 903DF, or indirect pointers [Rt] 903IT and [Rf] 903IF, form the linked list structure connecting the OCB instructions together. The direct pointers AddrTrue 903DT and AddrFalse 903DF or indirect pointers [Rt] 903IT and [Rf] 903IF replace the program counter register in prior art microprocessors, VLIW processors, etc.

Figure 26:
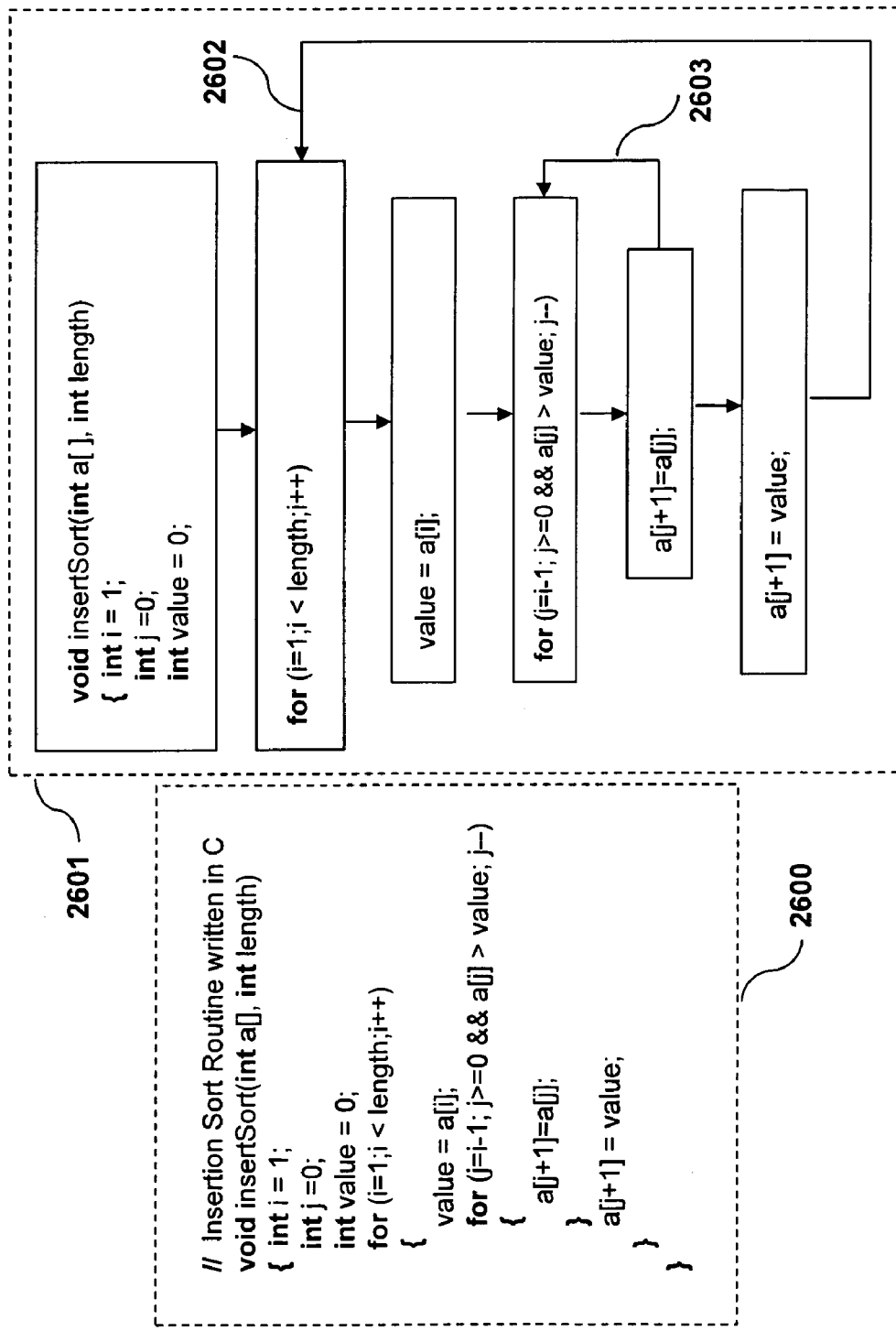
FIG. 26 is a prior art Insertion Sort Routine written in C.

In FIG. 26, a flow diagram 2601, for a prior art insertion sorting routine 2600 written in the C computer language, illustrates control flows 2602 and 2603.

FIG. 27 demonstrates the operation of the prior art insertion sort routine in 2700 for the string "insertion sort!!" where there is a space character between 'n' and 's'.

In FIG. 28, the insertion sorting routine of FIG. 27 was coded in OCB assembly language to demonstrate the operation of the 8-bit OCB processor simulation.

FIG. 29 shows a non-obfuscated version of the assembly language insertion sort routine as executed on the 8-bit OCB processor simulation. The non-obfuscated version can be compared to prior art microprocessor machine code, where the program counter sequentially increments to the next instruction, or, for a jump or branch instruction, copies the destination address into the program counter.

In FIG. 29, the instructions are placed in a sequential format similar to a prior art microprocessor with a program counter. For the OCB linked list structure of the present invention, placing the instructions in sequential order is not required.

Figure 30:
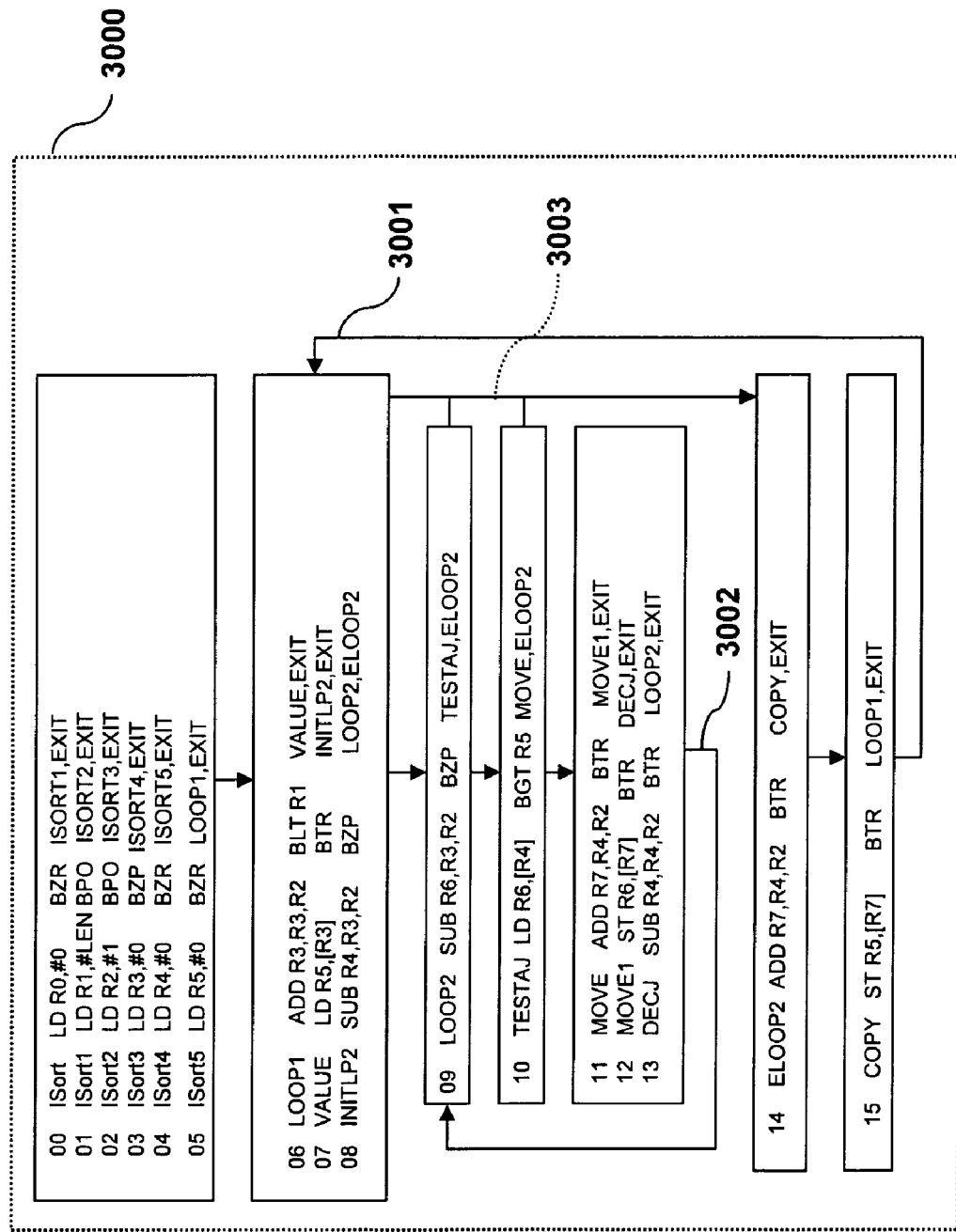
FIG. 30 is a flow graph for Non-obfuscated Insertion Sort for a simulation of the OCB processor of the present invention.

FIG. 30 is a flow graph 3000 for the non-obfuscated insertion sort routine of FIG. 29. Some program control flows are indicated by arrows 3001, 3002 and 3003.

FIG. 31 shows an instruction branch obfuscated version of the OCB insertion sort routine. FIG. 17 illustrates the linked list nature of an OCB program. The direct branch pointers B01, B02, B13, B12, B34, B32, B24, B22, B43, and B44 link the OCB instructions together. Due to the linked list nature of the OCB processor 1200, the order of the instructions can be arbitrarily arranged and watermarks 604 may be incorporated in the direct pointer links AddrTrue 903DT and AddrFalse 903DF, or indirect pointer links [Rt] 903IT or [Rf] 903IF. Watermarks 604 can be embedded inside the branch field pointers 903 and the program memory addresses used in OCB machine code instructions 900 using similar techniques from prior art software protection tools 1510.

Figure 32:
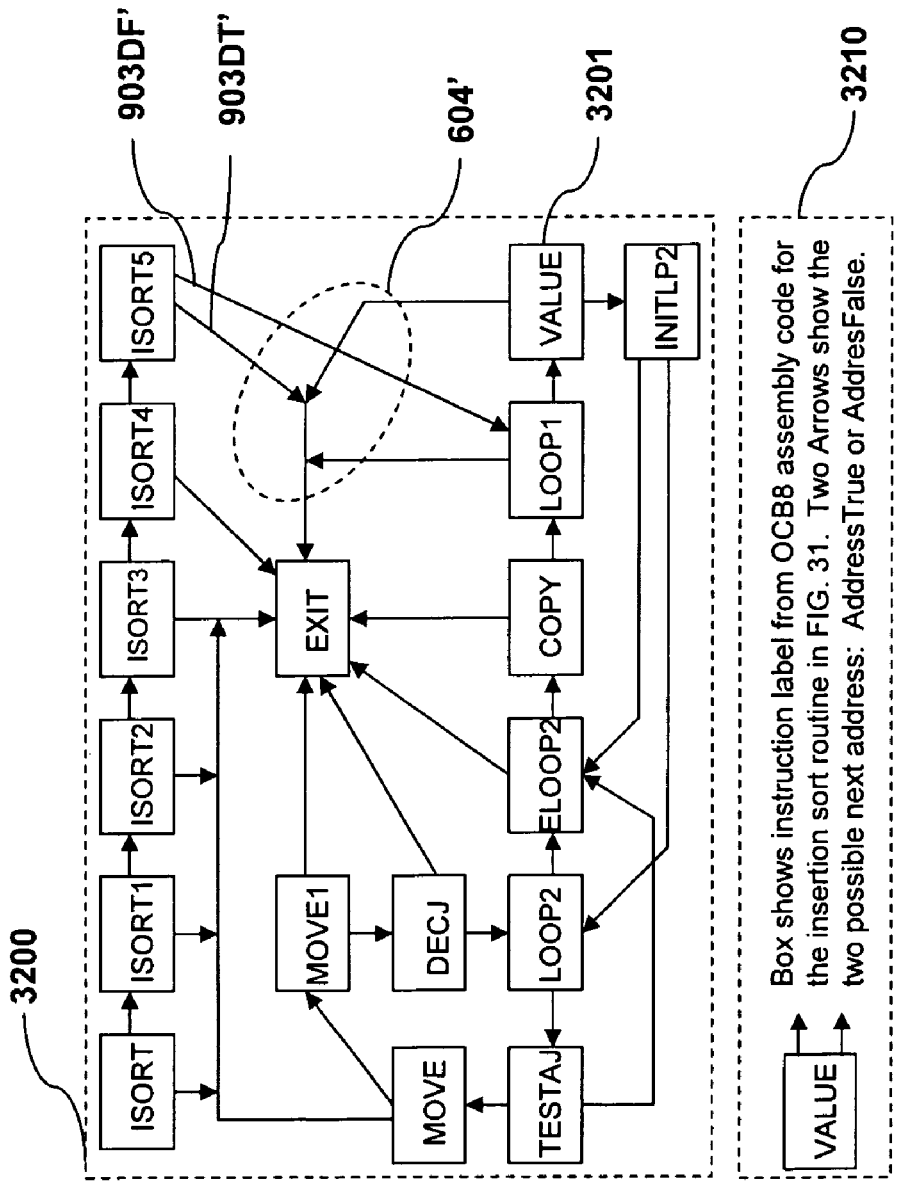
FIG. 32 is a schematic diagram, which demonstrates how watermarks can be stored in the branches contained in the OCB instruction's machine code of the present invention.

The obfuscated insertion sort routine from FIG. 31 is presented as a flow diagram in FIG. 32. As illustrated by node 3201, each node is represented by the assembly language instruction labels from FIG. 31. For node 3201, the label is VALUE from line 10:

10 VALUE LD R5, [R3] BTR INITLP2, EXIT.

The two direct branch pointer addresses 903D follow: AddrTrue 903DT is INITLP2, and AddrFalse 903DF is EXIT. Text 3210 describes the pointers for node VALUE.

The two connecting arrows for each node, as illustrated at node 3201, by pointers 903DT', and 903DF', represent two direct branch addresses AddrTrue 903DT and AddrFalse 903DF. Watermarks 604 can be placed in the lengths and positions of the pointers as illustrated by 903DT' and 903DF' which connect the OCB instructions together (see FIG. 17) using similar techniques for embedding watermarks from prior art software obfuscation tools 1510 (which includes scrambling software). By simply scrambling the order of the OCB instructions from FIG. 32 and incorporating watermarks 604 in the pointers 903DT' and 903DF' etc. an obfuscated program with built in software protections can be realized.

It is noted that the previously discussed indirect branch mode 903BI provides for dynamic obfuscation.

A microprocessor architecture of the present invention allows software watermarks, opaque predicates, branch level obfuscation, and other software protection mechanisms and techniques to be embedded inside the machine code instructions and structure of the machine code while maintaining hardware levels of performance. In the present invention, instruction branch level obfuscation is implemented in the linked list structure.

The large number of branch operations made possible by the present invention makes static analysis of code difficult. As Collberg and Thomborson stated in IEEE Transactions on Software Engineering, Volume 28, Issue 8, Aug. 2002 ". . . precise static analysis of pointer-based structures and parallel regions is known to be intractable." The utilization and implementation of the indirect branch mode 903BI of the present invention makes dynamic code analysis most difficult as well.

The OCB processor 1200 can be implemented as an application specific integrated circuit (ASIC), a field programmable gate array (FPGA), an integrated circuit, a virtual machine or other computer technologies. Combinations of the above are also possible. The preferred implementation of the OCB will depend on the application.

In prior art microprocessors, branch prediction, branch target prediction and speculative execution are used to reduce the branch penalty. However, in the present invention, branch prediction, branch target prediction or speculative execution are not required for the OCB processor. All possible next execution addresses are resolved at instruction load. Thus, no guessing is involved and no extra processor cycles are required to determine the next execution address.

The branch penalty problem of prior art microprocessors is solved by the OCB VLIW processor architecture of the present invention.

The invention disclosed can be expanded for use in complex branching systems. Utilization of longer instruction words with more complex operations are made possible. FIG. 33 shows an OCB instruction with a more complex mathematical operation and three branch conditions. A branch to subroutine feature can be added to the OCB processor.

The OCB VLIW processor of the present invention can be adapted for use with other microprocessor, processor, and computer technologies. OCB core technology can be combined with a standard VLIW processor core to create a hybrid core to utilize the standard VLIW core for most operations while utilizing the OCB core for handling branch instructions. The operation, compare, branch concept can be adapted to a complex instruction set computer (CISC) architecture. Vector and superscalar implementations are possible as well. OCB executables can be created with code generators, compilers and/or assemblers, etc.

Accordingly, various modifications are possible without deviating from the spirit of the present invention, with the scope of the invention being limited only by the claims which follow hereafter.

What is claimed is:

1. An operation, compare, branch processor for realizing zero branch penalty,
   comprising:
   a program memory (1203) having a program memory map (1500) containing a plurality of OCB instructions (900A, 900B, 900C) with each OCB instruction (900) of said plurality of OCB instructions having a memory address (905), an operation code field (901) having an op code (910) and an addressing mode (911), a comparison field (902), and a branch field (903);
   a first fetch circuit (1322*f*) directly connected to a second fetch circuit (1322*t*), said first and second fetch circuits receiving input from said program memory (1203);
   a third fetch circuit (1321*f*) connected to a fourth fetch circuit (1321*t*), said third and fourth fetch circuits sending output to said program memory (1203),
   decoding circuitry (1311);
   execution circuitry (1312) connected to said decoding circuitry;
   comparison circuitry (1316) connected to said execution circuitry;
   a latch circuit (1323) receiving input from said comparison circuitry (1316) and outputting to said third and fourth fetch circuits (1321*f*, 1321*t*) and to said decoding circuitry (1311);

a register file (1206) receiving input from said execution circuitry (1312), said register file (1206) outputting to said decoding circuitry (1311), to said execution circuitry (1312), to said third fetch circuit (1321*f*) and to said fourth fetch circuit (1321*t*);

a data memory bank (1205) connected so as to receive from and output to said execution circuitry (1312); and wherein a first OCB instruction (900A) is fetched by said first fetch circuit (1322*f*), said first OCB instruction (900A) is a direct mode (903BD) having two direct branch fields (903DT, 903DF), and wherein a second OCB instruction (900C) is fetched by said second fetch circuit (1322*t*), said second OCB instruction (900C) is an indirect mode (903BI) having two indirect branch-fields (903IT, 903IF).

2. An operation, compare, branch processor for realizing zero branch penalty, according to claim 1 wherein:

said decoding circuitry, said execution circuitry and said comparing circuitry form an execution pipeline (1310).

3. An operation, compare, branch processor for realizing zero branch penalty, according to claim 1 wherein:

said first, second, third and fourth fetch circuits form a fetching pipeline (1320).

4. An operation, compare, branch processor for realizing zero branch penalty, according to claim 3, wherein:

said first OCB instruction (900A) is contained within said first fetch circuit (1322*f*) and second OCB instruction (900C) is contained within second fetch circuit (1322*t*) during a cycle time (2530).

5. An operation, compare, branch processor for realizing zero branch penalty, according to claim 4, wherein:

said operation, compare branch processor is a VLIW processor.

* * * * *